US012770170B2

(12) United States Patent
Lynch et al.

(10) Patent No.: US 12,770,170 B2
(45) Date of Patent: Oct. 20, 2026

(54) SYSTEMS, METHODS, AND INTERFACES FOR DETERMINING A REFINISH ESTIMATE FOR AN ASSET

(71) Applicant: PPG Industries Ohio, Inc., Cleveland, OH (US)

(72) Inventors: Matthew K. Lynch, Cleveland, OH (US); Nicholas Tullett, Strongville, OH (US); Timothy W. Nevell, West Sussex (GB); Alison M. Norris, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/561,014

(22) PCT Filed: May 24, 2022

(86) PCT No.: PCT/US2022/072518

§ 371 (c)(1),
(2) Date: Nov. 15, 2023

(87) PCT Pub. No.: WO2022/251819

PCT Pub. Date: Dec. 1, 2022

(65) Prior Publication Data

US 2024/0257191 A1 Aug. 1, 2024

Related U.S. Application Data

(60) Provisional application No. 63/193,160, filed on May 26, 2021.

(51) Int. Cl.
*G06Q 30/0283* (2023.01)

(52) U.S. Cl.
CPC ................................ *G06Q 30/0283* (2013.01)

(58) Field of Classification Search
CPC ................................................. G06Q 30/0283
See application file for complete search history.

(56) References Cited

U.S. PATENT DOCUMENTS 3,383,244 A 5/1968 Cassman
3,512,894 A 5/1970 Wood
(Continued)

FOREIGN PATENT DOCUMENTS

AU 2002317629 B2 4/2005
AU 2005202921 A1 7/2005
(Continued)

OTHER PUBLICATIONS

J. Liao, Y. Wu, G. Wang, F. Wang, H. Chen and L. Long, "TSPvis: A Temperature Sensitive Paint Formulation Visual Design System," 2023 IEEE 6th International Conference on Pattern Recognition and Artificial Intelligence (PRAI), Haikou, China, 2023, pp. 644-649, doi: 10.1109/PRAI59366.2023.10331982. (Year: 2023).*
(Continued)

*Primary Examiner* — George Chen
*Assistant Examiner* — Danielle Elizabeth Zevitz

(57) ABSTRACT

A computer-implemented method can provide a graphical user interface comprising one or more selectable elements for entering information about a paint job corresponding to repair of an asset that has been damaged. The method can also include receiving user input including: (i) a digital scan of the asset by a hand-held instrument: (ii) a digital image taken of a portion of the asset to be repainted; and (iii) a user time estimate that corresponds to an amount of time needed to repaint the asset. Upon final selection of color, the method can further include displaying on the graphical user interface a final estimate to refinish the asset, wherein the final estimate includes a cost of repainting the asset based on a volume and cost of paint determined from the received final
(Continued)

color selection and received user input via the one or more initial input fields.

20 Claims, 8 Drawing Sheets

(56) References Cited

U.S. PATENT DOCUMENTS 4,403,866 A 9/1983 Falcoff et al.
4,434,010 A 2/1984 Ash
4,745,468 A 5/1988 Von Kohorn
4,900,611 A 2/1990 Carroll, Jr.
5,083,591 A 1/1992 Edwards et al.
5,177,694 A 1/1993 Graham et al.
5,592,597 A 1/1997 Kiss
5,643,341 A 7/1997 Hirsch et al.
5,649,259 A 7/1997 Hylen
5,774,357 A 6/1998 Hoffberg et al.
5,823,951 A 10/1998 Messerschmidt
5,825,402 A 10/1998 Swartz
5,897,239 A 4/1999 Caruthers et al.
5,907,495 A 5/1999 Snyder et al.
5,929,998 A 7/1999 Kettler et al.
5,971,767 A 10/1999 Kaufman et al.
5,987,168 A 11/1999 Decker et al.
5,991,081 A 11/1999 Haaland et al.
5,997,670 A 12/1999 Walter et al.
6,002,893 A 12/1999 Caruthers et al.
6,040,913 A 3/2000 Johnson
6,137,594 A 10/2000 Decker et al.
6,141,598 A 10/2000 Nam
6,152,597 A 11/2000 Potega
6,221,145 B1 4/2001 McClain
6,241,858 B1 6/2001 Phillips et al.
6,249,369 B1 6/2001 Theiste et al.
6,307,526 B1 10/2001 Mann
6,316,869 B1 11/2001 Kim et al.
6,354,426 B1 3/2002 Habisreitinger et al.
6,373,573 B1 4/2002 Jung et al.
6,407,847 B1 6/2002 Poll et al.
6,522,977 B2 2/2003 Corrigan et al.
6,539,325 B1 3/2003 Numata et al.
6,594,640 B1 7/2003 Postrel
6,633,905 B1 10/2003 Anderson et al.
6,667,700 B1 12/2003 Mccanne et al.
6,714,924 B1 3/2004 Mcclanahan
6,717,580 B1 4/2004 Tang
6,768,488 B1 7/2004 Kotani et al.
6,772,151 B1 8/2004 Johnston et al.
6,905,727 B2 6/2005 Spitzer et al.
6,924,817 B2 8/2005 Rice et al.
7,123,259 B2 10/2006 Cabral et al.
7,145,656 B2 12/2006 Rodrigues et al.
7,259,852 B2 8/2007 Masuda
7,337,127 B1 2/2008 Smith et al.
7,466,415 B2 12/2008 Gibson et al.
7,653,218 B1 1/2010 Malitz et al.
7,743,055 B2 6/2010 Rodrigues et al.
8,271,242 B2 9/2012 Berlin et al.
8,407,014 B2 3/2013 Prakash et al.
8,799,036 B1 8/2014 Christensen et al.
8,872,811 B1 10/2014 Rump et al.
9,406,024 B1 8/2016 Gordon et al.
9,702,830 B1 7/2017 Akselrod et al.
9,818,205 B2 11/2017 Neisen
10,002,362 B1 6/2018 Endress et al.
10,152,494 B2 12/2018 Thomas et al.
10,260,232 B1 4/2019 Conboy
10,613,727 B2 4/2020 Beymore et al.
10,871,888 B2 12/2020 Norris et al.
10,922,726 B1 * 2/2021 Nelson ............... G06Q 30/0283
2001/0015548 A1 8/2001 Breed et al.
2001/0036309 A1 11/2001 Hirayama et al.
2001/0041966 A1 11/2001 Corrigan et al.
2001/0050030 A1 12/2001 Friel et al.
2001/0055462 A1 12/2001 Seibel
2002/0009601 A1 1/2002 Stachowiak
2002/0019481 A1 2/2002 Andreoli et al.
2002/0028288 A1 3/2002 Rohrbaugh et al.
2002/0032787 A1 3/2002 Overton et al.
2002/0071104 A1 6/2002 Silverbrook
2002/0099725 A1 7/2002 Gordon
2002/0118294 A1 * 8/2002 Takano .................. H04N 23/88
348/370
2002/0138211 A1 9/2002 Spitzer et al.
2002/0154112 A1 10/2002 Voye et al.
2002/0181766 A1 12/2002 Mcclanahan et al.
2002/0184167 A1 12/2002 Mcclanahan
2002/0184168 A1 12/2002 Mcclanahan et al.
2002/0184171 A1 12/2002 Mcclanahan
2003/0063388 A1 4/2003 Berman et al.
2003/0067475 A1 4/2003 Hirayama et al.
2003/0082516 A1 5/2003 Straus
2003/0099264 A1 5/2003 Dantus et al.
2003/0122487 A1 7/2003 Kwon
2003/0125911 A1 7/2003 Snyder et al.
2003/0149373 A1 8/2003 Reade et al.
2003/0151611 A1 * 8/2003 Turpin ................ G06F 3/04845
345/589
2003/0174099 A1 9/2003 Bauer et al.
2003/0175609 A1 9/2003 Combes et al.
2003/0187610 A1 10/2003 Dorrance et al.
2003/0205059 A1 11/2003 Roche et al.
2003/0208345 A1 11/2003 O'Neill et al.
2003/0231485 A1 12/2003 Chien
2004/0003050 A1 1/2004 Lewis
2004/0004119 A1 1/2004 Baldassari et al.
2004/0004639 A1 1/2004 Simonis
2004/0032363 A1 2/2004 Schantz et al.
2004/0042662 A1 3/2004 Wilensky et al.
2004/0092637 A1 5/2004 Mcclanahan
2004/0123778 A1 7/2004 Bagala
2004/0135504 A1 7/2004 Tamaki et al.
2004/0139889 A1 7/2004 Zimmermann et al.
2004/0153437 A1 8/2004 Buchan
2004/0176188 A1 9/2004 Morgan et al.
2004/0218182 A1 11/2004 Alman et al.
2004/0239928 A1 12/2004 Masuda
2004/0240712 A1 12/2004 Rowe et al.
2005/0043971 A1 2/2005 Hendrickson et al.
2005/0106355 A1 5/2005 Kohlman et al.
2005/0112610 A1 5/2005 Lee et al.
2005/0128484 A1 6/2005 Rodrigues et al.
2005/0150740 A1 7/2005 Finkenzeller et al.
2005/0160077 A1 7/2005 Howes
2005/0198874 A1 9/2005 Wurm
2005/0212159 A1 9/2005 Richards et al.
2005/0270533 A1 12/2005 Hoffmann
2005/0287354 A1 12/2005 Jennings et al.
2006/0008602 A1 1/2006 Mills
2006/0010066 A1 1/2006 Rosenthal et al.
2006/0061777 A1 3/2006 Duggan et al.
2006/0067592 A1 3/2006 Walmsley et al.
2006/0067651 A1 3/2006 Chui
2006/0132516 A1 6/2006 Walmsley et al.
2006/0143454 A1 6/2006 Walmsley
2006/0152527 A1 7/2006 Minchew et al.
2006/0181707 A1 8/2006 Gibson et al.
2006/0183458 A1 8/2006 Sena
2006/0187251 A1 8/2006 Pulver et al.
2006/0245632 A1 11/2006 Nisper et al.
2006/0276367 A1 12/2006 Shah et al.
2007/0003691 A1 1/2007 Rodrigues et al.
2007/0035554 A1 2/2007 Mcclanahan
2007/0097119 A1 5/2007 Steenhoek et al.
2007/0097472 A1 5/2007 Ha
2007/0104663 A1 5/2007 Henglein et al.
2007/0105993 A1 5/2007 Germroth et al.
2007/0109619 A1 5/2007 Eberl et al.
2007/0139667 A1 6/2007 Russell et al.
2007/0172113 A1 7/2007 Sai et al.
2007/0209585 A1 9/2007 Ebensberger et al.
2007/0292608 A1 12/2007 Rodrigues
2008/0130022 A1 6/2008 Dalal et al.

(56) References Cited

U.S. PATENT DOCUMENTS

2008/0154691 A1 6/2008 Wellman et al.
2008/0169926 A1 7/2008 Reep
2008/0187708 A1 8/2008 Decker et al.
2008/0235224 A1* 9/2008 Joseph Rodrigues ... B05D 5/06
2008/0243661 A1 10/2008 Bussone et al.
2008/0291449 A1 11/2008 Rodrigues et al.
2008/0293857 A1 11/2008 Crawford et al.
2009/0004126 A1 1/2009 Lowndes
2009/0157212 A1 6/2009 Mcclanahan et al.
2009/0157349 A1 6/2009 Walker
2009/0157535 A1* 6/2009 Choiniere .............. G06Q 10/06 705/30
2009/0185201 A1 7/2009 Lin et al.
2009/0248199 A1 10/2009 Milhorn
2009/0274827 A1 11/2009 Anderson et al.
2009/0295823 A1 12/2009 Henry
2009/0296112 A1 12/2009 Gil et al.
2009/0296113 A1 12/2009 Mestha et al.
2010/0012866 A1 1/2010 Fan et al.
2010/0044897 A1 2/2010 Chisnall et al.
2010/0067056 A1 3/2010 Rich et al.
2010/0094601 A1 4/2010 Steenhoek
2010/0132828 A1 6/2010 Stelzl
2010/0189348 A1 7/2010 Dalal et al.
2010/0213387 A1 8/2010 Safai et al.
2010/0217529 A1 8/2010 Stroila et al.
2010/0217538 A1 8/2010 Safai et al.
2010/0244700 A1 9/2010 Chong et al.
2010/0253489 A1 10/2010 Cui et al.
2010/0261488 A1 10/2010 Little et al.
2010/0265522 A1 10/2010 Dalal et al.
2010/0284615 A1 11/2010 Dalal et al.
2010/0299106 A1 11/2010 Audoly et al.
2010/0304640 A1 12/2010 Sofman et al.
2010/0319176 A1 12/2010 Stewart et al.
2011/0005008 A1 1/2011 Schoots et al.
2011/0090548 A1 4/2011 Mestha et al.
2011/0097691 A1 4/2011 Bornemann et al.
2011/0098029 A1 4/2011 Rhoads et al.
2011/0150326 A1 6/2011 Jeong et al.
2011/0159921 A1 6/2011 Davis et al.
2011/0170534 A1 7/2011 York
2011/0213664 A1 9/2011 Osterhout et al.
2011/0215562 A1 9/2011 Bleikolm et al.
2011/0226161 A1 9/2011 Schumacher et al.
2011/0234621 A1 9/2011 Steenhoek
2011/0292042 A1 12/2011 Vaganov
2012/0080106 A1 4/2012 Griebel et al.
2012/0087581 A1 4/2012 Rasmusson et al.
2012/0092342 A1 4/2012 Suzuki et al.
2012/0092367 A1 4/2012 Suzuki et al.
2012/0098845 A1 4/2012 Kirchner et al.
2012/0120425 A1 5/2012 Kamijima
2012/0157587 A1 6/2012 Meyer et al.
2012/0235313 A1 9/2012 Yan et al.
2012/0286700 A1 11/2012 Maxik et al.
2012/0288195 A1 11/2012 Lings et al.
2013/0010150 A1 1/2013 Silverbrook
2013/0015239 A1 1/2013 Silverbrook
2013/0033513 A1 2/2013 Rasmusson et al.
2013/0063568 A1 3/2013 Silverbrook
2013/0072303 A1 3/2013 Mineur et al.
2013/0078624 A1 3/2013 Holmes et al.
2013/0079236 A1 3/2013 Holmes
2013/0088728 A1 4/2013 Chen et al.
2013/0108979 A1 5/2013 Daon
2013/0202157 A1 8/2013 Pershing
2013/0215439 A1 8/2013 Mcdowell et al.
2013/0219263 A1 8/2013 Abrahami
2013/0225763 A1 8/2013 Pai-Paranjape et al.
2013/0235067 A1 9/2013 Cherna et al.
2013/0278076 A1 10/2013 Proud
2013/0320276 A1 12/2013 Farrell
2014/0068797 A1 3/2014 Doudna et al.
2014/0080556 A1 3/2014 Knutsson
2014/0082854 A1 3/2014 Landa et al.
2014/0123871 A1 5/2014 Dehmel
2014/0168712 A1 6/2014 Smith
2014/0195468 A1 7/2014 Mohammadi et al.
2014/0231625 A1 8/2014 Chang et al.
2014/0242271 A1 8/2014 Prakash et al.
2014/0253610 A1 9/2014 Alman et al.
2014/0272240 A1 9/2014 Planche
2014/0274658 A1 9/2014 Sherwood et al.
2014/0277699 A1 9/2014 Moix et al.
2014/0313303 A1 10/2014 Davis et al.
2014/0327761 A1 11/2014 Holzl
2014/0327762 A1 11/2014 Holzl
2014/0350867 A1 11/2014 Alspach et al.
2015/0015650 A1 1/2015 Landa et al.
2015/0048132 A1 2/2015 Stein
2015/0049745 A1 2/2015 Han et al.
2015/0055085 A1 2/2015 Fonte et al.
2015/0070510 A1 3/2015 Mui
2015/0070694 A1 3/2015 Fan et al.
2015/0106723 A1 4/2015 Bertelsen
2015/0126463 A1 5/2015 Hsiao et al.
2015/0134300 A1 5/2015 Norris
2015/0134773 A1 5/2015 Salem
2015/0172894 A1 6/2015 Gabel
2015/0211987 A1 7/2015 Burg et al.
2015/0276485 A1 10/2015 Alman
2015/0348001 A1 12/2015 Van et al.
2015/0371417 A1 12/2015 Angelov et al.
2016/0004953 A1 1/2016 Karani et al.
2016/0005187 A1 1/2016 Prakash
2016/0016229 A1 1/2016 Czinger et al.
2016/0019208 A1 1/2016 Thomas et al.
2016/0063862 A1 3/2016 Rosen
2016/0082625 A1 3/2016 Luukko et al.
2016/0128876 A1 5/2016 Chandrasekaran et al.
2016/0255969 A1 9/2016 High et al.
2016/0279021 A1 9/2016 Hyde et al.
2016/0306977 A1 10/2016 Zarakas et al.
2016/0313294 A1 10/2016 Dattilo et al.
2016/0321546 A1 11/2016 Delespierre et al.
2016/0325529 A1 11/2016 Linthout et al.
2016/0346921 A1 12/2016 Orman et al.
2016/0380158 A1 12/2016 Sasaki et al.
2017/0059759 A1 3/2017 Ayres et al.
2017/0074522 A1 3/2017 Cheng
2017/0083762 A1 3/2017 Segalovitz et al.
2017/0098058 A1 4/2017 Mccullough et al.
2017/0139417 A1 5/2017 Reiff et al.
2017/0148371 A1 5/2017 Qian
2017/0164178 A1 6/2017 Anjum et al.
2017/0173791 A1 6/2017 Dalibard et al.
2017/0237879 A1 8/2017 Kiser et al.
2017/0242570 A1 8/2017 Beymore et al.
2017/0243362 A1 8/2017 Neisen
2017/0248514 A1 8/2017 Pavey et al.
2017/0263594 A1 9/2017 Chung et al.
2017/0300856 A1 10/2017 Wilkinson et al.
2017/0308749 A1 10/2017 Tanno
2017/0354169 A1 12/2017 Van et al.
2018/0024076 A1 1/2018 Efner et al.
2018/0038838 A1 2/2018 Karancsi et al.
2018/0047198 A1 2/2018 Walters
2018/0056940 A1 3/2018 Etonye
2018/0120435 A1 5/2018 Decker et al.
2018/0121864 A1 5/2018 Sullivan et al.
2018/0122061 A1 5/2018 Chatterjee et al.
2018/0156663 A1 6/2018 Farley et al.
2018/0156775 A1 6/2018 Chou et al.
2018/0158123 A1 6/2018 Caruso et al.
2018/0158124 A1 6/2018 Caruso et al.
2018/0215546 A1 8/2018 High et al.
2018/0218582 A1 8/2018 Hodge et al.
2018/0293734 A1 10/2018 Lim et al.
2019/0033491 A1 1/2019 Lu et al.
2019/0070887 A1 3/2019 Peters et al.
2019/0078274 A1 3/2019 Mcneeely
2019/0078936 A1 3/2019 Bischoff et al.
2019/0200844 A1 7/2019 Shelton et al.

(56) References Cited

U.S. PATENT DOCUMENTS

| | | | |
|---|---|---|---|
| 2019/0212256 A1 | 7/2019 | Joch et al. | |
| 2019/0301083 A1 | 10/2019 | Mor et al. | |
| 2019/0382606 A1 | 12/2019 | Iraqi et al. | |
| 2020/0025988 A1 | 1/2020 | Lee et al. | |
| 2020/0064194 A1 | 2/2020 | Dauga et al. | |
| 2020/0088581 A1 | 3/2020 | Steenhoek et al. | |
| 2020/0089991 A1 | 3/2020 | Steenhoek et al. | |
| 2020/0101783 A1 | 4/2020 | Jancart et al. | |
| 2020/0111201 A1 | 4/2020 | Kuruvilla et al. | |
| 2020/0147954 A1 | 5/2020 | Efner et al. | |
| 2020/0264773 A1 | 8/2020 | Kim et al. | |
| 2020/0342630 A1 | 10/2020 | Elmoznino et al. | |
| 2021/0181091 A1 | 6/2021 | Norris et al. | |
| 2021/0395879 A1 | 12/2021 | Zhang et al. | |

FOREIGN PATENT DOCUMENTS

| | | | |
|---|---|---|---|
| AU | 2009308956 | A1 | 5/2010 |
| AU | 2013200172 | A1 | 7/2014 |
| AU | 2014210627 | A1 | 2/2016 |
| BR | PI0617941 | A2 | 3/2010 |
| CA | 2645429 | A1 | 5/2009 |
| CN | 107194081 | A | 9/2017 |
| CN | 107944107 | A | 4/2018 |
| CN | 108875792 | A | 11/2018 |
| CN | 109173827 | A | 1/2019 |
| CN | 109596104 | A | 4/2019 |
| CN | 111087750 | A | 5/2020 |
| CN | 111778477 | A | 10/2020 |
| DE | 202013002764 | U1 | 5/2013 |
| DE | 102014010239 | A1 | 1/2016 |
| DE | 102019110181 | A1 | 10/2020 |
| EP | 0388932 | A2 | 9/1990 |
| EP | 0833165 | A2 | 4/1998 |
| EP | 1615010 | A1 | 1/2006 |
| EP | 2074158 | A1 | 7/2009 |
| EP | 2130014 | A1 | 12/2009 |
| EP | 2444440 | A2 | 4/2012 |
| EP | 2600333 | A2 | 6/2013 |
| EP | 2813829 | A1 | 12/2014 |
| EP | 3155560 | A1 | 4/2017 |
| ES | 2362069 | A1 | 6/2011 |
| ES | 1144959 | U | 10/2015 |
| ES | 2735284 | A1 | 12/2019 |
| ES | 1253300 | U | 10/2020 |
| GB | 1294536 | A | 11/1972 |
| IN | 2197/DELNP/2014 | A | 5/2016 |
| JP | 02-292699 | A | 12/1990 |
| JP | 09-249000 | A | 9/1997 |
| JP | 2001-174333 | A | 6/2001 |
| JP | 2002-351887 | A | 12/2002 |
| JP | 2003-006197 | A | 1/2003 |
| JP | 2003-034762 | A | 2/2003 |
| JP | 2004-224966 | A | 8/2004 |
| JP | 2005-098980 | A | 4/2005 |
| JP | 2005-206734 | A | 8/2005 |
| JP | 2006-213854 | A | 8/2006 |
| JP | 2008-170155 | A | 7/2008 |
| JP | 2020-042000 | A | 3/2020 |
| JP | 6703639 | B1 | 6/2020 |
| KR | 10-1410122 | B1 | 6/2014 |
| KR | 10-2015-0096966 | A | 8/2015 |
| MX | PA02004129 | A | 4/2004 |
| MX | 2010008501 | A | 2/2012 |
| WO | 99/04368 | A1 | 1/1999 |
| WO | 2000/037362 | A1 | 6/2000 |
| WO | 02/69038 | A2 | 9/2002 |
| WO | 2004/102134 | A2 | 11/2004 |
| WO | 2005/029766 | A2 | 3/2005 |
| WO | 2005/097876 | A1 | 10/2005 |
| WO | 2006/052556 | A2 | 5/2006 |
| WO | 2006/052561 | A2 | 5/2006 |
| WO | 2007/021376 | A1 | 2/2007 |
| WO | 2007/139653 | A1 | 12/2007 |
| WO | 2008/051320 | A1 | 5/2008 |
| WO | 2008/051321 | A1 | 5/2008 |
| WO | 2011/048147 | A1 | 4/2011 |
| WO | 2011/163583 | A1 | 12/2011 |
| WO | 2013/092679 | A1 | 6/2013 |
| WO | 2013/118868 | A1 | 8/2013 |
| WO | 2014/135467 | A1 | 9/2014 |
| WO | 2015/081313 | A2 | 6/2015 |
| WO | 2015/084139 | A1 | 6/2015 |
| WO | 2015/192117 | A1 | 12/2015 |
| WO | 2016/019176 | A1 | 2/2016 |
| WO | 2016/026856 | A1 | 2/2016 |
| WO | 2016/172316 | A1 | 10/2016 |
| WO | 2018/041727 | A1 | 3/2018 |
| WO | 2018/070428 | A1 | 4/2018 |
| WO | 2018/181745 | A1 | 10/2018 |
| WO | 2019/224097 | A1 | 11/2019 |
| WO | 2019/224100 | A1 | 11/2019 |
| WO | 2020/049860 | A1 | 3/2020 |
| WO | 2020/057458 | A1 | 3/2020 |
| WO | 2020/057464 | A1 | 3/2020 |
| WO | 2020077449 | A1 | 4/2020 |
| WO | 2020/096626 | A1 | 5/2020 |
| WO | 2020/120681 | A1 | 6/2020 |
| WO | 2020/123443 | A1 | 6/2020 |
| WO | 2020/125839 | A1 | 6/2020 |
| WO | 2020/157244 | A1 | 8/2020 |
| WO | 2020/169678 | A1 | 8/2020 |
| WO | 2020/173696 | A1 | 9/2020 |
| WO | 2020/200982 | A1 | 10/2020 |
| WO | 2022/233580 | A1 | 11/2022 |

OTHER PUBLICATIONS

International Search Report and Written Opinion received for PCT Application Serial No. PCT/US2022/073617 dated Oct. 12, 2022, 11 pages.

International Search Report and Written Opinion received for PCT Application Serial No. PCT/US2022/074123 dated Dec. 5, 2022, 11 pages.

"AkzoNobel Introduces Connect API to Share Collision Repair Shop Data with Third Party Software", Retrieved from https://collisionweek.com/2020/10/13/akzonobel-introduces-connect-api-share-collision-repair-shop-data-third-party-software/, Oct. 13, 2020, 6 Pages.

"Anatomy of an ARC Swatch—Arc", Retrieved on http://arcswatch.com/index.php/anatomy-of-an-arc-swatch/, Retrieved on Oct. 3, 2022, 4 Pages.

"Best Car Customisation Games", Retrieved from https://www.allcarleasing.co.uk/blog/best-car-customization-games/, Mar. 28, 2019, 10 Pages.

"BMW Individual Manufaktur Visualizer", Retrieved from https://visualizer.bmw-individual.com/lpps/bmwoac?page=imc&market=80001-DE&dc=1-1&header=1&qrcode=1&pdf=1&lang=EN#top, Retrieved on Oct. 3, 2022, 2 Pages.

"Car Wrap Visualizer", Retrieved on https://graphics.averydennison.com/en/home/resources-and-learning/carvisualizer.html, Retrieved on Oct. 3, 2022, 3 Pages.

"Carbeat", Retrieved from https://www.carbeat.com/, Retrieved on Oct. 3, 2022, 8 Pages.

"Carwrapper", Retrieved from https://www.carwrapper.com/, Retrieved on Retrieved on Oct. 3, 2022, 11 Pages.

"CGL Car Paint Presets Pack 1.0," Retrieved from https://www.youtube.com/watch?v=Li5n52R9FQU, Retrieved on Dec. 20, 2022, pp. 3.

"Color & Appearance", Retrieved from https://web.archive.org/web/20021202225811/http://www.xrite.com/helpdesk/DocList_01.asp?Market=6, Mar. 2, 2020, 12 Pages.

"Color Finder", Retrieved on https://www.sw-rodandrestocustomcolor.com/find-your-color, Retrieved on Oct. 3, 2022, 11 Pages.

"Color tools", Yatu paint, Retrieved from https://global.yatupaint.com/color-tools/, Retrieved on Oct. 4, 2022, 1 Page.

"Freebie: Advanced car paint OSL shader," Retrieved from https://cg-lion.com/2020/07/25/freebie-advanced-car-paint-osl-shader/, Jul. 25, 2020, pp. 8.

(56) References Cited

OTHER PUBLICATIONS

"Important Information About New MetalliX-QC® Features," X-Rite, 1992, pp. 223.
"Maaco auto body shop and painting", Retrieved from https://www.maaco.com/press/maaco-app-android/, Retrieved on Oct. 3, 2022, 4 Pages.
"Market Place Novel products," European Coatings Journal, (2015), p. 2.
"Metallix Master v1.80", Retrieved from https://web.archive.org/web/20020902004912/http://www.xrite.com/helpdesk/DocDetail.ASP?DocNr=613, Mar. 2, 2020, 1 Page.
"SEM's QR Codes Make Life Easier for Technicians", Retrieved from https://www.semproducts.com/blog/sems-qr-codes-make-life-easier-for-technicians, Oct. 2, 2020, 5 pages.
AkzoNobel, Carbeat in a nutshell, Controlling the pulse of your business, (2017), 2 pages.
Anatomy of an ARC Swatch—Arc, avaialble online at <arcswatch.com/index.php/anatonny-of-an-arc-swatch/>, printed on (Dec. 7, 2020), 3 pages.
Arredondo et al., "Multilevel color transfer on images for providing an artistic sight of the world", IEEE Access, vol. 5, 2017, pp. 15390-15399.
Berezhnoy et al., "Computer analysis of Van Gogh's complementary colours", Pattern Recognition Letters, vol. 28, Issue 6, Apr. 15, 2007, pp. 703-709.
Berns et al., "The science of digitizing paintings for color-accurate image archives: A review", Journal of Imaging Science and Technology, vol. 45, No. 4, 2001, 21 Pages.
Choudhary, "Principles of Colour and Appearance Measurement vol. 2: Visual Measurement of Colour, Colour Comparison and Management", pp. 55-116, 2015.
CollisionWeek, AkzoNobel Introduces Connect API to Share CoL-Lision Repair Shop Data with Third Party Software, (Oct. 13, 2020), 4 pages.
Gupta et al., "Wood coating failures against natural and accelerated climates", Construction Materials, vol. 168(1), Feb. 2015, pp. 3-15.
Herrera et al., "Weathering resistance of thermally modified wood finished with coatings of diverse formulations", Progress in Organic Coatings vol. 119, Jun. 2018, pp. 145-154.
Hollman et al., "Colours a la carte", European Coatings Journal, Jan. 2009.
Huang et al., "Environment-friendly pigments based on praseodymium and terbium doped La2Ce2O7 with high near-infrared reflectance: Synthesis and characterization", Dyes and Pigments, vol. 147, Dec. 2017, pp. 225-233.
Innovative Repair And Refinishing Products I SEM Products, available online at <https://www.semproducts.com>, printed on (Dec. 7, 2020), 3 pages.
Kim. D.B. et al., "Computer-aided appearance design based on BRDF measurements," Computer-Aided Design, 2011, vol. 43, pp. 1181-1193.
Komatsubara et al., "Visual color matching under various viewing conditions", December 2002Color Research & Application, vol. 27, No. 6, pp. 399-420.
Lee et al., "Hue-shift modeling and correction method for high-luminance display", 2007 IEEE International Conference on Image Processing, 2007, pp. 465-468.
Linhares et al., "Color diversity index: The effect of chromatic adaptation", Proc. of SPIE vol. 8001 800104-1, May 2011, 9 Pages.
Malm et al., "Influence of rheology modifiers and coating parameters on the color-changing effects of textile coatings with multi-layered mica pigments", vol. 85, Issue 9, 2014, pp. 936-948.
Medina et al., "Fluctuation scaling of color variability in automotive metallic add-on parts", Progress in Organic Coatings, vol. 104, Mar. 2017, pp. 118-124.
Mohammadalizadeh et al., "Modelling the orange-peel texture for chromatic and achromatic samples", Progress in Organic Coatings, vol. 135, Oct. 2019, pp. 148-155.
Mohammadalizadeh, A., et al., "Effect of color on some geometric attributes of visual appearance of non-effect coatings," Journal of Coatings Technology and Research, vol. 17, No. 6, Feb. 2020, pp. 949-961.
Moreno et al., "Car Visualizer", Retrieved from https://experiments.withgoogle.com/car-visualizer, Retrieved on Oct. 3, 2022, 3 Pages.
Radu Metz, "Method for the Determination of Tolerance and for the Improvement of Agreement Between Color Differences Assessed Visually and with the DELTA E", Federation d'Associations de Techniciens des Industries des Peintures, Vernis, Em (1982), vol. 2, pp. 257-270.
Saeedi et al., "How anisotropy of CIELAB color space affects the separation effect: An experimental study", Journal of the Optical Society of America A vol. 36, Issue 1, pp. 51-60 (2019).
SEM's OR Codes Make Life Easier for Technicians, (Oct. 2, 2020), 4 pages.
Shamey et al., "Performance of various color difference models in challenging regions of CIELAB color space", Society for Imaging Science and Technology, 2014, 7 Pages.
Shimizu, C., et al., "Interactive Goniochromatic Color Design," DBLP, The Eleventh Color Imaging Conference: Color Science and Engineering Systems, Technologies, Jan. 2003, pp. 7.
Sramcik, T., "Inventory Optimization, Right-Size your Paint Department Supplies with these Expert Tips," vol. 55.12, Dec. 2016, pp. 56-60.
Westlund et al., "Applying Appearance Standards to Light Reflection Models", Department of Computer and Information Science, University of Oregon, Aug. 12-17, 2001, pp. 501-510.
Yatu, Professional Refinish Color Tools, available online at <https://global.yatupaint.com/color-tools/>, 1 page.
Zumkley, J., "Basf introduces AUROOM™, a platform for the digital visualization of automotive exterior colors", available online at <BASF introduces AUROOM™, a platform for the digital visualization of automotive exterior colors>, Nov. 6, 2018, 7 pages.
International Search Report and Written Opinion received for PCT Application Serial No. PCT/US2022/072518 dated Sep. 12, 2022, 14 pages.

* cited by examiner

400

SYSTEMS, METHODS, AND INTERFACES FOR DETERMINING A REFINISH ESTIMATE FOR AN ASSET

BACKGROUND OF THE INVENTION

1. Technical Field

The present invention relates to devices, computer-implemented methods, and systems for estimating the refinishing of an asset.

2. Background and Relevant Art

Modern coatings provide several important functions in industry and society. Coatings can protect a coated material from corrosion, such as rust. Coatings can also provide an aesthetic function by providing a particular color and/or texture to an object. For example, most assets such as automobiles are coated using paints and various other coatings in order to protect the metal body of the automobile from the elements and also to provide aesthetic visual effects.

In view of the wide-ranging uses for different coatings, it is often necessary to identify a target coating composition. For instance, it might be necessary to identify a target coating composition on an asset that has sustained damage (e.g., has been in an accident). However, due to the nature of complex mixtures within coatings, it is sometimes difficult to formulate, identify, and/or search for acceptable matching formulations and/or pigmentations. Even in the case where a suitable match can be identified, frequently the coating on the asset will have aged or denatured in such a way that recoating the damaged portion with the original coating still creates a mismatch in color upon later inspection.

In general, paint manufacturers develop a large range of coatings with different colors, color variations, color effects, and the like, whether for the original automotive companies, or independently, such as to refinish assets painted with coatings from another manufacturer. The sheer volume and range of colors and coatings developed by paint manufacturers frequently provides a suitable overall color match with most damaged assets where basic color comparison on a display screen is the only consideration. Close inspection after application, however, frequently reveals small deviations in the colors that may not be apparent to the repair operator (e.g., auto-body operator), relevant front office manager, or the asset owner when looking at a color chip or computer display screen during the estimation process.

For example, there may be differences owing to the color or physical characteristics of the underbody coating, or other effect pigments. Along these lines, flake, metallic, or other gonioapparent pigments added to the formulation can provide a mixed paint with a completely different overall color effect in certain lighting conditions than the same mixture of tint and base paint without the effect pigment. Moreover, while some coatings historically require multiple layers or added ingredients to achieve a particular effect, a new version of the coating may be made using a different technology that allows for the same visible effect but with fewer ingredients.

These differences in cost and makeup of coatings of certain colors that at first glance appear to be identical can create significant cost estimation challenges for operators and/or front office workers of an asset repair facility, such as an auto-body shop. In particular, asset repair facilities can incur significant financial harm and waste inefficiency when an estimator underestimates the true cost of obtaining a particular color for refinishing an asset, and discovers after application that a carefully matched color has a very different look in daylight. A similar harm can occur when the asset repair facility inadvertently uses a more expensive alternative of a color when the asset owner, or a third-party payor (e.g., insurance) has not agreed to cover the more expensive variety, or the cost of replacing an incorrect color match with the correct one.

Thus, there are many opportunities for new methods and systems that improve the efficiency and speed of identifying and estimating coating applications, not to mention environmental costs of waste mitigation.

BRIEF SUMMARY

The present invention provides systems, methods, and computer program products described for efficiently and accurately estimating coating formulations (also referred to as paints herein) in refinish of an asset, in part by enabling more realistic and accurate color matches. For example, the present invention comprises computerized systems employing methods for providing an accurate, just-in-time estimate for an asset to be repainted. The present invention also comprises computerized methods and systems employing machine learning algorithms in connection with 3D rendering techniques to enable accurate coating match and selection for assets in need of refinishing.

For example, a computer-implemented method for providing an accurate, just-in-time estimate of an asset to be repainted can include providing a graphical user interface comprising one or more selectable elements for entering information about a paint job, the paint job corresponding to repair of an asset that has been damaged. The method can also include receiving user input via the one or more initial input fields, wherein the received user input includes: (i) a digital scan of the asset by a hand-held instrument; (ii) a digital image taken of a portion of the asset to be repainted; and (iii) a user time estimate that corresponds to an amount of time needed to repaint the asset. In addition, the method can include retrieving from a database a plurality of closest match colors corresponding to the spectrophotometer data. Furthermore, the method can include displaying on the graphical user interface a plurality of selectable color tiles corresponding to the spectrophotometer data, wherein at least one of the selectable color tiles includes a cost indicator. Upon selection of any of the selectable color tiles, the method still further includes displaying on the graphical user interface a 3D image of a color corresponding to the selected tile, wherein the 3D image shows different color effects at different angles of the displayed color from a light source. Yet still further, the method can include, upon receiving a final color selection of the selectable color tiles, displaying on the graphical user interface a final estimate to refinish the asset, wherein the final estimate includes a cost of repainting the asset based on a volume and cost of paint determined from the received final color selection and received user input via the one or more initial input fields.

An additional or alternative computer-implemented method for providing an accurate, just-in-time estimate of an asset to be repainted can include receiving user input via one or more initial input fields displayed on a graphical user interface, wherein the received user input includes: (i) a digital scan of a color by a hand-held instrument; (ii) a digital image taken of a portion of the asset to be repainted; and (iii) a user time estimate that corresponds to an amount of time needed to repaint the asset. The method can also include using one or more machine learning algorithms to automatically determine an area of the asset to be repainted, and displaying the digital image with one or more lines drawn around the determined area of the asset. In addition, the method can include receiving one or more user inputs that adjusts the lines drawn on the determined area, thereby providing an adjusted area of the asset to be repainted. Furthermore, the method can include retrieving from a database a plurality of closest match colors corresponding to results of the digital scan.

Still further, the method can include displaying on the graphical user interface a plurality of selectable color tiles corresponding to results of the digital scan, wherein at least one of the selectable color tiles comprises a premium color tile displaying a premium color and a corresponding text indicator of cost status. Yet still further, the method can include, upon selection of the premium color tile, displaying on the graphical user interface a 3D image of the asset showing a repaired form of the adjusted area that has been painted with the premium color. In this case, the 3D image shows different color effects at different angles of the displayed premium color from a single light source. In addition, the method can include, upon receiving a final color selection of the premium color, displaying on the graphical user interface a final estimate to refinish the asset. In this case, the final estimate includes a list of parts needed to repair the asset, and a cost of repainting the asset based on a volume of paint determined from the digital image and the user time entry.

Yet another additional or alternative computer-implemented method for providing an accurate, just-in-time estimate of an asset that has been damaged to be repainted using a computer system, can include obtaining color data associated with the asset by a hand-held scanning instrument; taking a digital image of a portion of the asset to be repainted by an image capture element; transferring the obtained color data and digital image to the computer system; receiving user input via a graphical user interface of the computer system comprising one or more selectable elements for entering information about a paint job corresponding to a repair of the asset, wherein the received user input includes a user time estimate that corresponds to an amount of time needed to repaint the asset; optionally automatically determining, by analysis of the digital image through the computer system, an area of the asset to be repainted, and displaying, by the computer system, the digital image with one or more lines drawn around the determined area of the asset, wherein the drawn lines are adjustable by a user to provide an adjusted area of the asset to be repaired; the method further comprising: retrieving, by the computer system, from a database a plurality of closest match colors corresponding to the obtained color data associated with the asset; displaying, by the computer system, on the graphical user interface a plurality of selectable color tiles corresponding to the retrieved closest match colors, wherein at least one of the selectable color tiles includes a cost indicator; upon selection of any of the selectable color tiles, displaying, by the computer system, on the graphical user interface (a) a 3D image of a color corresponding to the selected tile, wherein the 3D image shows different color effects at different angles of the displayed color from one or more light sources or (b) a 3D image of the asset showing a repaired form of the determined and optionally adjusted area of the asset to be repainted that has been painted with the color corresponding to the selected tile, wherein the 3D image shows different color effects at different angles of the displayed color from a single light source; and upon receiving respective user input, displaying, by the computer system, on the graphical user interface a final estimate to refinish the asset, wherein the final estimate includes a cost of repainting the asset based on a volume and cost of paint determined from a particular color of the selectable color tiles finally selected by the user and the received user input about the paint job.

Additional features and advantages will be set forth in the description which follows, and in part will be obvious from the description, or may be learned by practice. The features and advantages may be realized and obtained by means of the instruments and combinations particularly pointed out in the appended claims and aspects. These and other features will become more fully apparent from the following description and appended claims, or may be learned by the practice of the examples as set forth hereinafter.

BRIEF DESCRIPTION OF THE DRAWINGS

In order to describe the manner in which the above recited and other advantages and features can be obtained, a more particular description will be rendered by reference to specific examples thereof, which are illustrated in the appended drawings. Understanding that these drawings are merely illustrative and are not therefore to be considered to be limiting of its scope, the present invention will be described and explained with additional specificity and detail through the use of the accompanying drawings in which.

DETAILED DESCRIPTION

The present invention provides systems, methods, and computer program products described for efficiently and accurately estimating coating formulations (also referred to as paints herein) in refinish of an asset, in part by enabling more realistic and accurate color matches. For example, the present invention comprises computerized systems employing methods for providing an accurate, just-in-time estimate for an asset to be repainted. The present invention also comprises computerized methods and systems employing machine learning algorithms in connection with 3D rendering techniques to enable accurate coating match and selection for assets in need of refinishing.

For example, the present invention can provide a number of benefits to end users, such as operators of an asset repair facility (e.g., auto-body shop), front office workers managing a bidding system, or even asset owners looking to select an appropriate color at minimal cost. Such benefits can include improved and more efficient color matching used to refinish an asset, such as by enabling better, more realistic matching and interactive display of colors. The benefits can further include improved and more efficient pricing and estimation of asset refinish projects with accurately selected colors, thereby avoiding costly mistakes that necessitate further repair and repainting. One will appreciate that such efficiencies can have large, positive impacts on the environment through waste mitigation, such as by, at least in part, minimizing the amount of materials needed for any particular project.

Figure 1A:
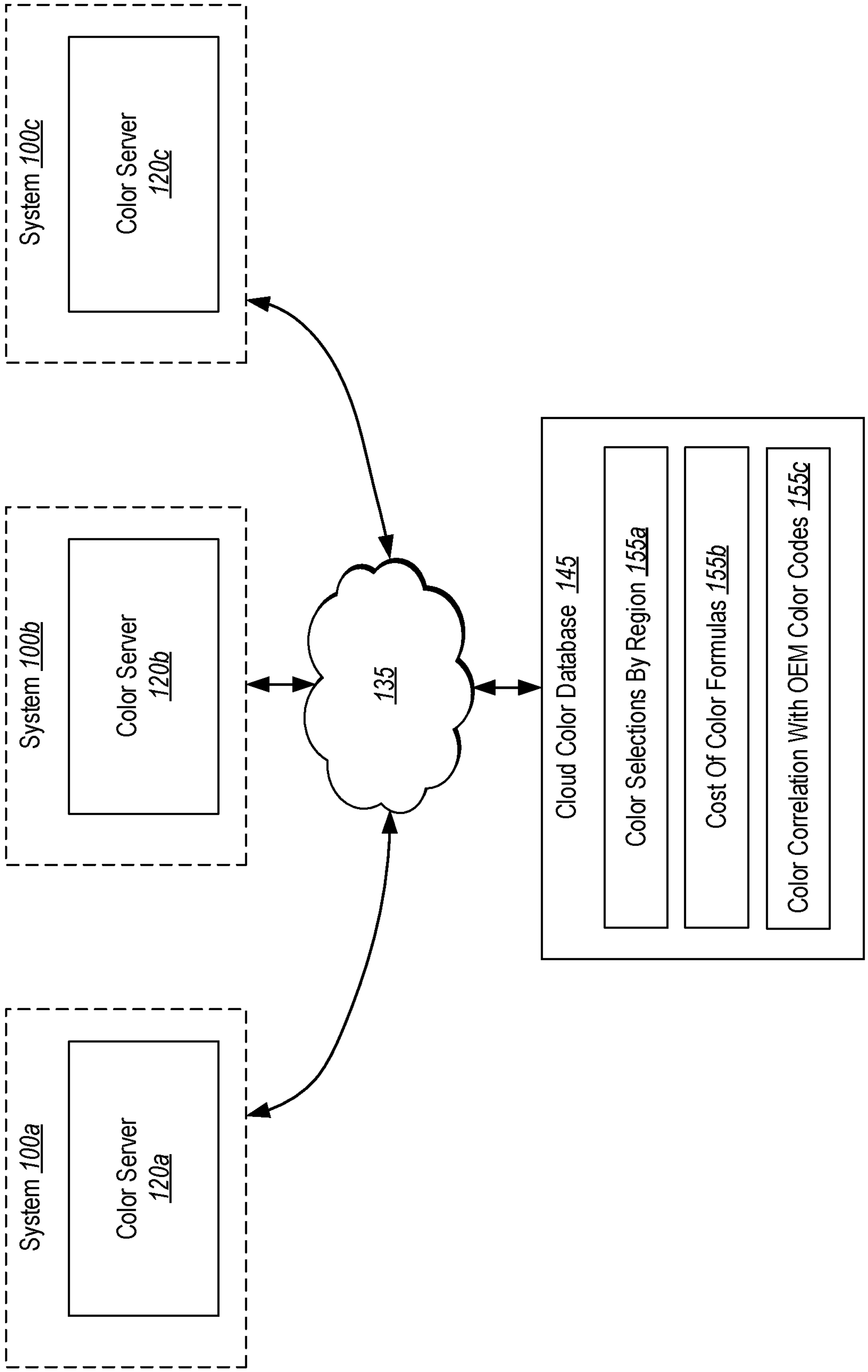
FIG. 1A illustrates an overview schematic of a system in which a plurality of systems coordinate color data and selection with a remote color database over a network.

For example, FIG. 1A illustrates an overview schematic of a system that can be used to practice the computer-implemented methods as described herein in which a plurality of computer systems coordinate color data with a remote color manager over a network. In particular, FIG. 1A illustrates an environment in which a plurality of computer systems (or "systems") 100(*a-c*) comprising local color servers 120(*a-c*) communicate and store data remotely over a network 135 with, for example, a cloud color database 145. As understood more fully herein, the various color servers 120*a-c* gather data corresponding to user selection, color matching, and asset repair at various asset repair shops, such as local auto-body shops. The color servers 120*a-c* can comprise one or more stand-alone computer systems, as well as an application or partition of a single device used by the local operator, such as an auto-body refinish operator, or front office worker. Moreover, the one or more devices on which the color server 120(*a-c*) resides may be installed locally at the asset repair shop, or remote thereto (e.g., a virtual machine), and thus accessible over network 135. The color servers 120*a-c* can comprise any number of digital computing devices, including but not limited to one or more laptops, tower computer systems, tablet computers, or personal device assistants, including mobile phones.

FIG. 1A further shows that the one or more color servers 120(*a-c*) interact over network 135 with one or more cloud color manager systems 145 (or simply "cloud color manager (s)"). In general, the cloud color manager(s) 145 similarly can include one or more remote computing devices that gather, process, and relay user selections, or recent updates to color profiles. Along these lines, FIG. 1A shows that the cloud color database 145 includes a component 155*a* for storing color selections by region. For example, cloud color database 145 can store data about coating components (e.g., formula/ingredients/parameters) and sub-components selected by users in the eastern United States to coat a car of one particular year, make, and model, as well as similar selections by other users in different parts of the United States (or in another region of the world) to coat the same car. That is, the cloud color database 145 can keep an ongoing, continually updated database for what colors or versions thereof users are selecting in Europe, Australia, Eastern Asia, South America, and so forth. This data can help account for regional and personal selection differences selected by region to obtain the same overall look and color feel, and/or to account for regional preferences in desired end color or overall color appearance/effect.

FIG. 1A also shows that the cloud color database 145 can include a cost component, such as the illustrated cost of color formulas component 155*b*. The cost of color formulas component 155*b* can include cost information about the overall volumetric pricing for a given coating, as well as pricing for each individual sub-component, such as continually updated costs of base of particular physical types, costs of effect pigment (e.g., XIRALLIC, gonioapparent pigment, metallic flake, mica, pearlescent pigments, and the like), and costs of various color tints. Coatings with greater or lower relative pricing due either to the cost of the coating itself, or the extra labor or special application process(es) needed to apply it, such as those with multiple coating layers (e.g., tricoat, XIRALLIC) can be marked as such in the stored record.

In addition, FIG. 1A shows that the cloud color manager (s) 145 can include a component for correlating color with OEM color codes, namely the illustrated component 155*c*. In one instance, an operator, or automated update interface, can continually update cloud color database 145 with both historical and recent updates to an asset manufacturer's coating codes and formulations used to coat a particular asset. Thus, the cloud color database 145 can store information such as the coating color and formulation used to coat a piece of heavy industrial equipment in the year 1970, as well as that used for a particular automobile of a certain make, and model as created in the year 2021, and so on.

The cloud color database 145 can also store various secondary indicia associated with each color and color formulation. For example, the cloud color database 145 can store barcode, QR code, and/or VIN (vehicle identification number) data associated with each color record, which may enable an end user to scan the corresponding code on the asset itself, and then enable the user to pull the record for the original color as stored by the cloud color database 145. Pulling the full record for the original color can indicate all components/ingredients/layers, and other parameters known about the original coating application. The color database 145 can also serve as a central repository for the most recent updates of a coating manufacturer's colors, color names, and related physical data, such as formula, spectral, colorimetric, RGB, CIELAB (i.e., L*a*b*), and/or XYZ tristimulus data and related conversion data, as well as image data, for each color and corresponding color sub-component used to make a particular coating.

The cloud color database(s) 145 may also, for example, coordinate with one or more databases of one or more asset (e.g., auto) manufacturers (which may or may not be the coating manufacturer). This coordination can ensure the cloud color manager is able to regularly obtain similar formula, spectral, colorimetric, RGB, CIELAB (i.e., L*a*b*), and/or XYZ tristimulus values (and related conversions) for each color used to coat the assets by the asset manufacturer as they are applied each year. The secondary and physical data corresponding to each color can be used to retrieve color matches as described more fully herein. For purposes of this specification and claims, "primary color data" refers to the color name or color code used to identify a particular coating, namely human readable labels that an end user might use to identify a color or color profile, such as Midnight Blue. Meanwhile, "secondary color data" refers to inherent physical characteristic data and machine-readable data other than express color name or color code, such as barcode, QR code, or physical characteristic data associated with a particular coating. Physical characteristic data can include spectral reflectance data, colorimeter data, CIELAB values, RGB values, and so forth.

Figure 1B:
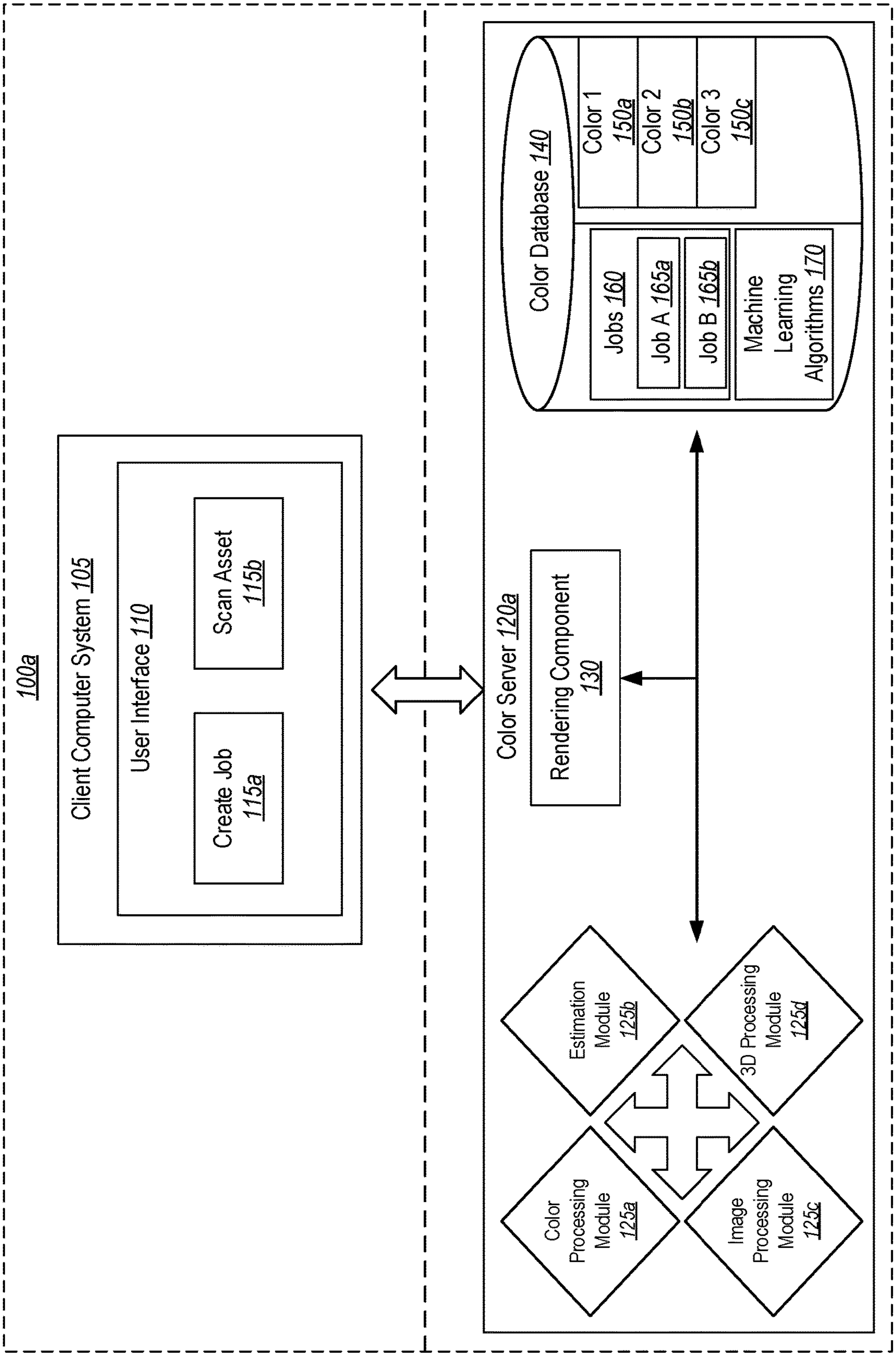
FIG. 1B illustrates a schematic of one of the local systems of FIG. 1A, further illustrating components and modules implemented between a corresponding client and server.

FIG. 1B illustrates a schematic of one of the local computer systems of FIG. 1A, in this case system 100*a*, further illustrating components and modules implemented between a corresponding client and server. In general, each local computer system 100 (i.e., 100*a-c*, etc.) can comprise at least one client computer system 105 that communicates with a color server (i.e., 120*a-c*, etc.) For example, FIG. 1B shows that system 100*a* can comprise at least client computer systems 105 in communication with color server 120*a*. The client computer system 105 can comprise any number or type of portable or stationary computer device, including but not limited to a desktop computer system with an attached display/monitor, or a mobile computing device, such as a laptop, tablet computer, mobile phone, or other personal device assistant.

As previously indicated, FIG. 1B further shows that client computer system 105 is in communication with color server 120*a*. The color server 120*a* may comprise an application or virtual machine installed on the client computer system 105 itself, or may be an application installed on a separate, stand-alone computing system, such as a local or remote computer system connected to client computer system 105 over a local or global network. In particular, network 135 may be a global, wide, or local area network, including the Internet. FIG. 1B further shows that the color server 120*a* comprises a number of modules (e.g., 125*a*-125*d*), components (e.g., 130), and databases (e.g., 140) that assist in management and relay of relevant color data viewed by the client system 105.

In general, modules 125(*a-d*) and components 130 will be understood as abstractions of generalized processing components that can be used in at least one implementation of the present invention, and there may be more or fewer than those illustrated and described, and as may be suited for a particular server and cloud operating environment. As used herein, a "module" means computer executable code that, when executed by one or more processors at a given computer system (e.g., computer system 105, or server 120), causing the given computer system to perform a particular function. By contrast, a "component" means a passive set of instructions or data structures or records that store, manage, and/or otherwise provide information handled through a given module. One of skill in the art, however, will appreciate that the distinction between different modules or components is at least in part arbitrary, and that modules or components may be otherwise combined and divided and still remain within the scope of the present disclosure. As such, the description of a component as being a "module" or a "component" is provided only for the sake of clarity and explanation and should not be interpreted to indicate that any particular structure of computer executable code and/or computer hardware is required, unless expressly stated otherwise. In this description, the terms "component," "agent," "manager," "service," "engine," "virtual machine" or the like may also similarly be used.

In any event, FIG. 1B shows that color server 120*a* can further comprise one or more color databases 140, which may itself include one or more additional data stores, such as the jobs data store component 160, a data store for a set of color records 150(*a-c*), and a data store for storing and accessing one or more machine learning algorithms 170. In general, color server 120 can employ machine learning algorithms 170 with any number of the modules 125(*a-d*) as applicable to identify asset defects (e.g., a crashed or damaged portion of an asset), to learn from the prior human input (described above) identifying the area needing refinish or repair, and improve analysis expertise over time. Such machine learning algorithms 170 can comprise but are not limited to algorithms for use in object or image segmentation, such as supervised learning algorithms, unsupervised learning algorithms, semi-supervised learning algorithms, reinforcement learning algorithms, self-learning algorithms, feature learning algorithms, anomaly detection algorithms, robot learning algorithms, and/or composite versions thereof.

Figure 1C:
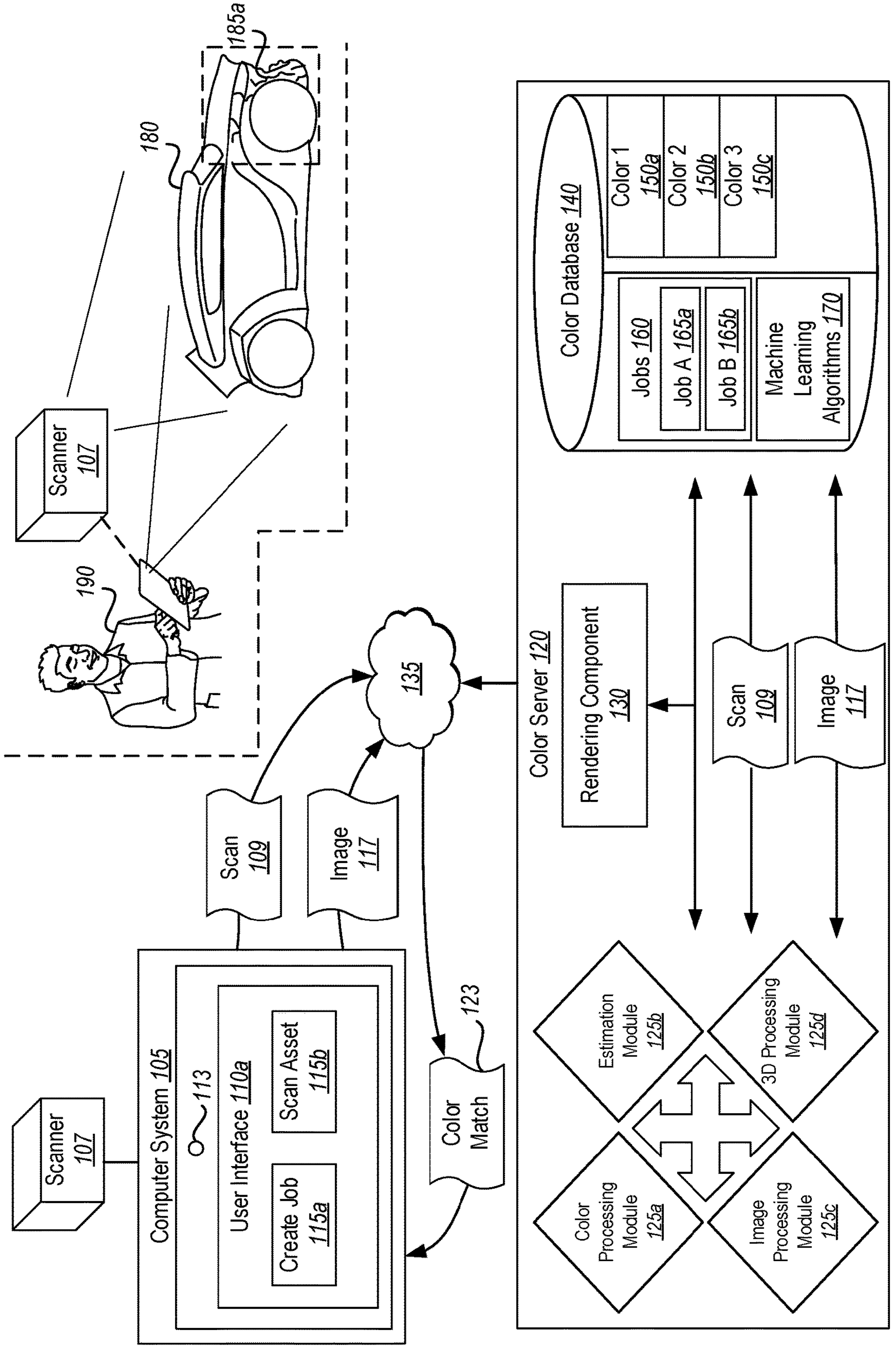
FIG. 1C illustrates a schematic in which an end user interacts with the components shown in FIGS. 1A-1B to process an asset.

FIG. 1C illustrates a schematic in which an end user interacts with the components shown in FIGS. 1A-1B to process an asset for eventual refinish. As shown, user 190 interacts with a user interface 110*a* displayed on computer system 105. FIG. 1C further shows that computer system 105 comprises one or more image capture elements 113. Image capture element 113, such as a digital camera, may be integrated with computer system 105, as shown, or alternately connected to the computer system 105, such as via a wired (e.g., USB, ethernet) or wireless (e.g., WIFI, Bluetooth, etc.) connection. FIG. 1C also shows that computer system 105 can be connected to a scanning instrument (also referred to herein as a scanner) 107, and one will appreciate that this can also be connected similarly via a corresponding wired or wireless connection. In one example, one or both of scanner 107 and image capture element 113 is/are connected to a cloud server over a network (e.g., Internet) connection, such as to color server 120 over network 135, and computer system 105 accesses the corresponding images or scan data from the color server 120 indirectly over network 135.

In any case, FIG. 1C shows that user interface 110*a* displays a plurality of selectable elements 115*a*, 115*b*, etc. for creating a job corresponding to repair of asset 180. In one example, user 190 captures data corresponding to the asset 180 to be repaired, in this case the illustrated portion 185*a* showing physical damage. One will appreciate that "damage" is not limited to ordinary physical damage owing to impact/deformation of the asset 180 necessarily, but may also include areas of discoloration, such as fade, rust, or other forms of coating degradation or coating imperfection, which might trigger a given user 190 to recoat or refinish all or part of the asset 180. In addition, one will appreciate that examples of the present invention are not limited to refinish or recoating of damaged assets, as such, and that an end user 190 may be performing another type of project, such as building and painting an asset from scratch or from scrap parts, building a kit car, or simply painting an existing asset entirely just to change its color. Nevertheless, the present invention is described herein primarily with respect to refinish of an asset 180 needing repair for purposes of convenience.

In at least one method of operation, user 190 opens user interface 110, and selects selectable element 115*a* for creating a job. User 190 then uses the image capture element 113 to snap an image of the asset 180 to be repaired, including the damaged portion 185*a*. User 190 can also select the selectable asset 115*b* to scan the asset, and then scans the asset 180, and/or damaged portion thereof 185*a* to identify color and other secondary color data/indicia. For example, upon selecting element 115*b*, user 190 uses and deploys scanner 107 (or image capture element 113) to scan a barcode scanner to scan a barcode, QR code, or VIN element presented on the asset 180. Along these lines, some asset manufacturers now include computer-readable or scannable information embedded within barcodes or QR codes affixed to an inside of a door jamb along with or beside a VIN for the given asset. In other cases, scanner 107 comprises a colorimeter or spectrophotometer, such as provided by any number of other instrument manufacturers. In at least one example, the scanner 107 comprises a portable, hand-held spectrophotometer connected to computer system 105 via suitable cable such as USB, or is connected wirelessly via Bluetooth, WIFI, or other suitable communication protocol.

In either case, FIG. 1C shows that computer system 105 provides the capture image data (typically in RGB format) from the device camera to color server 120 via one or more messages 117. In addition, FIG. 1C shows that the user 190 scans all or part of the asset 180 needing repair. In one example, the user 190 scans with the scanner 107 only the non-damaged portions of the automobile, whereas in other examples the user 190 scans the damaged area of the asset 180 to be repaired. The user sends the scanned data, including any or all the various scans including barcode, VIN, or QR code data, spectral data, and any other colorimetric data via one or more corresponding messages 109 to color server 120.

Color server 120 can then process the received data from one or both of messages 117 and 109. For example, color server 120 can store the data associated with either or both of scan 109 and image 117 through the color database 140, such as by initiating a job (e.g., "Job A") record in the corresponding Jobs 160 data structure. The color server 120 can also process the data in any of the processing modules 125*a*, 125*b*, 125*c*, and/or 125*d*. For example, in one example, estimation module 125*b* coordinates receipt of image 117 is to create "Job A," and prepares a data structure for later use by the estimation interface 110*b* (e.g., FIG. 2A).

In addition, the image processing module 125*c* can perform object and/or image segmentation analysis via one or more machine learning algorithms 170 to identify and draw lines around areas that the machine learning algorithms automatically identified for the presence of damage or defect, (i.e., area/portion 185*a*). In addition, color processing module 125*a* can perform a number of analyses of the image, spectral, and/or colorimetric data received to identify relevant, closest color matches among colors 150*a*, 150*b*, and 150*c* stored in color database 140. For example, color processing module 125*a* can identify that barcode information received in scan data 109 identifies a particular color from a particular make, model, and year of an automobile, and further identify from the color database which particular undercoat(s) and pigment effects were used in the formula for that particular color record.

Similarly, color processing module 125*a* can determine that the original coating identified in the scan data 109 is not one created by a known paint manufacturer stored in the color database 140, but that several other colors that have similar secondary color data by comparison of physical characteristics, such as similar spectral, CIELab, and/or XYZ tristimulus value matches. Color processing module 125*a* can then gather those color records that match or otherwise fit within an acceptable range of deviation from the actual measurement (e.g., by computing a z-score of the measured color relative to a group of colors with similar physical measurements), and provide that as a response for further user input. FIG. 1C shows that color server 120 then sends one or more responses back to computer system 105 in the form of one or more color match messages 123. As discussed more fully herein, computer system 105 can then handle the response information through user interface 110*a*.

Figure 2A:
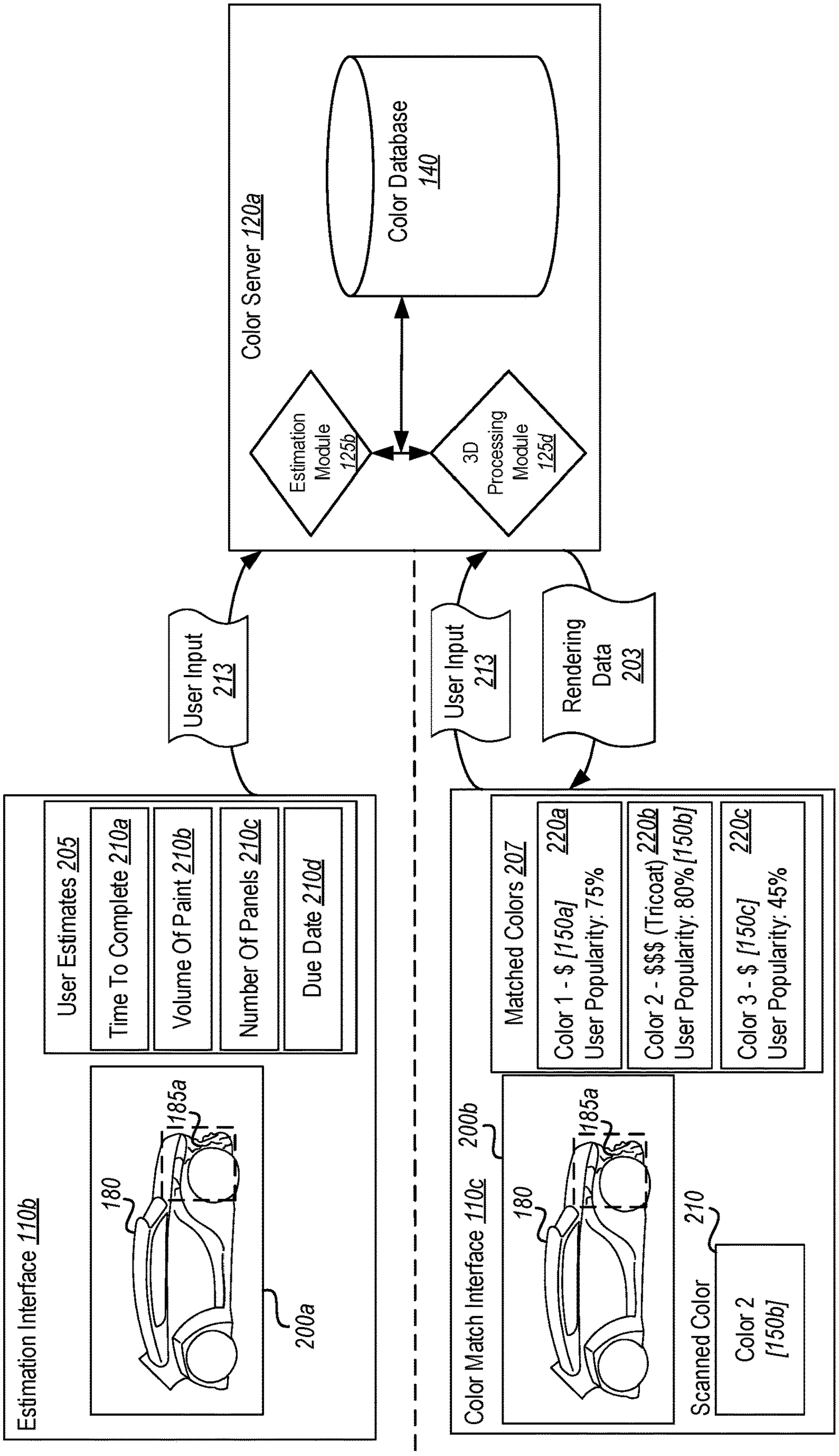
FIG. 2A illustrates a schematic in which a user provides various estimates and color selections pursuant to refinishing the asset.

For example, FIG. 2A illustrates a schematic in which computer system 105 renders an update to the user interface 110, namely through display of estimation interface 110*b*. User interface 110*b* can be provided to the original user 190, or to another operator who will be working on refinish of asset 180. It is not required that estimation interface 110*b* and the original user interface 110*a* be sequentially handled by the same person or entering entity. For example, in one example, one auto-body operator performs the initial intake with the scanner 107 and image capture element 113, while another auto-body operator separately enters estimate data in estimation interface 110*b*. In still another example, a front office worker that is in the same location or remote of the auto-body operator can perform one of these scanning or estimation steps separately before the asset 180 is received at the asset repair shop.

In either case, FIG. 2A shows that estimation interface 110*b* comprises an interactive display of 200*a* of asset 180. For example, through one or more selectable elements (not shown) in a prior user interface, a user continues with a workflow related to "Job A," in this case the job of repairing asset 180. Accordingly, estimation interface 110*b* pulls the image data taken originally from image capture element 113 (or other device) for asset 180, and loads an interactive display 200*a*. In one example, the interactive display 200*a* includes an image of just a portion of asset 180, or a representative image of just a portion of panel (e.g., a tile) showing the color and effect as retrieved from the image file. In another example, interactive display 200*a* shows an interactive image of the entire asset 180 as photographed, along with the damaged portion 185*a*.

FIG. 2A further shows interactive display 200*a*, which comprises rendering data 203 received from color server 120*a*. In one example, rendering data 203 includes original image information received via messages 117, and/or scan information from messages 109. In general, rendering data 203 comprises the relevant data points of messages 109 and 117 that have been rendered by rendering component 130 for display.

In this case, FIG. 2A shows that the interactive display 200*a* displays a rendering of asset 180 and further includes a designation of the damaged portion, namely portion 185*a*. As previously indicated, the designated portion 185*a* can be automatically determined by the image processing module 125*c* and relevant machine learning algorithms 170. Alternatively, or in connection with machine learning algorithms, the user can draw a line around the damaged portion shown in the interactive display 200*a*. The computer system 105 can then make determinations based on the exhibited damage and number of underlying parts known for this portion of asset 180 to automatically determine the number of panels and parts that will need to be replaced. For example, cloud color database 145 may store a list of parts needed to replace panels at varying levels of damage for various makes, models, and years, of various assets.

In addition, FIG. 2A shows that the computer system 105 provides a user estimate interface 205. For example, FIG. 2A shows that the user estimate interface 205 comprises an entry field 210*a* for time to complete the repair, a field 210*b* for entering an estimated volume of paint, a field 210*c* for a number of panels to be painted, and a field 210*d* for a date of completion. One will appreciate that these field entry components 210*a*-210*d* are merely exemplary, and that a user estimate interface may include other fields of interest, such as fields to enter year, make, and model of the asset, where that information could not be automatically determined through prior steps. Furthermore, some of these fields may be pre-populated by computer system 105 based on data determined from messages 109 and 117 and in connection with image processing module 125*c* and/or machine learning algorithms 170. For example, the user estimate interface 205 may preliminarily indicate in field 210*a* "5 hrs" of time to complete the job, preliminarily indicate "2 gallons" of paint, and leave empty the fields 210*c* and 210*d*.

The user can then interact with the user estimate interface 205 to adjust the preliminarily determined data in each field where applicable, and supply other information where missing. Computer system 105 continually sends user input 213 back to the color server 120*a* for storage and management in connection with the Job A stored in the Jobs 160 data structure.

FIG. 2A further shows that the user can initiate a color match interface 110*a*, which provides another interactive display 200, namely interactive display 200*b*, again with asset 180. In this case, the color match interface 110*c* also displays an indication of the scanned color tile 210. In one example, the scanned color 210 comprises a representation of an OEM (original equipment manufacturer) color determined from barcode or other data known about asset 180 and its characteristics of make, model, year, etc. In another example, the scanned color tile 210 represents an image of the asset 180 (or small tile portion thereof) taken through image capture element 113, and displayed for comparison purposes.

In this case, FIG. 2A displays the scanned color 210, and illustrates a suggested color match (i.e., "Color 2") which corresponds to one of the matched colors shown by tiles 220*a*, 220*b*, and 220*c* in the matched color interface 207. FIG. 2A also shows that the matched color interface 207 displays a color tile for each of the matched colors 220*a*, 220*b*, 220*c* deemed to be closest to the color of asset 180, and/or portion 185*a*. Furthermore, FIG. 2A shows that each color tile comprises one or more cost indicators. For example, FIG. 2A shows that the matched color tile 220*b* for "Color 2" shows a multiple dollar symbol ("SSS") as well as a parenthetical indicating that the color corresponds to a "tricoat" color, which requires multiple different coats and/or sub-components to achieve the displayed color effect. By contrast, the matched color interface 207 displays color tiles 220*a* and 220*c*, corresponding to "Color 1" and "Color 3," respectively, each with a single dollar symbol ("S"), meaning that "Color 1" and "Color 3" cost less per volume than "Color 2."

FIG. 2A further shows that the matched color interface 207 can indicate one or more user popularity indicators. For example, color tile 220*a* displays a "75%" popularity, while color tile 220*b* displays an "80%" popularity rating, and color tile 220*c* displays a "45%" popularity rating. These popularity ratings can be further distinguished based on region, and further divided based on selections by users (e.g., asset owners) or third-party payors (e.g., insurance). For example, upon selection of color tile 220*b*, the matched color interface 207 might further display an indication that Color 2 carries a popularity of 90% among asset owners in the southern United States, but only a 20% popularity among third-party payors in the same region, or perhaps a 55% popularity by end users in a similar climate but different country in the world. These sorts of metrics can help end users, asset repair shops, and front office personnel make informed decisions that can directly impact not just the cost of repair, but the extent to which a repair is likely to be paid in full by insurance, or likelihood a repair is likely to be visually accepted by an end user after application.

Along these lines, an asset repair shop may alternately present the matched colors interface 207 to an asset owner, along with the various color, cost, and popularity metrics. The asset owner, rather than the asset repair operator, may decide to select a slightly less popular color match (i.e., "Color 1") due to its lower cost but nevertheless acceptable overall appearance. Similarly, the asset owner may alternately select the more expensive, more popular option, knowing that a third-party payor may only reimburse a small portion of the cost of repair and thus that the asset owner may be required to provide an up front payment for the remainder. At least in part since the user can toggle the interactive interface 200*b* to show asset 180 displayed in interactive 3D with each of the matched colors on selection, and since the color selection is likely to be far more accurate by relating to colorimetric, spectrophotometric, and/or OEM color matching of the car in its present state, the estimation process saves significant cost and effort for both the estimator and the end-user, as well as any other third-party payors. That is, accurate interactive display, among other things, can ensure that initial cost estimates are more likely to reflect the final end price since the colors and costs presented to the user and asset repair personnel are more likely to reflect the actual color upon application, and thus accepted.

Figure 2B:
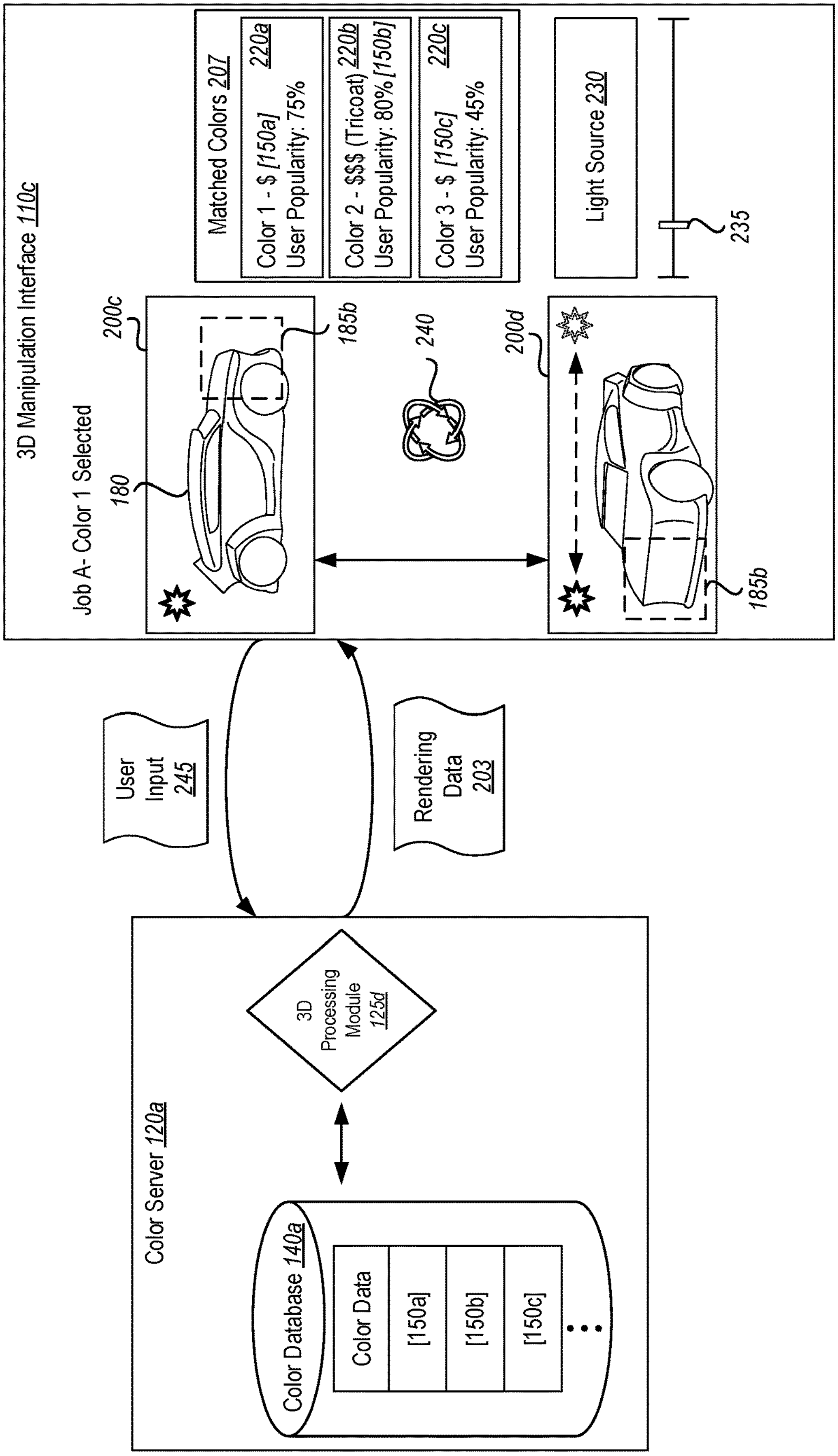
FIG. 2B illustrates a schematic in which the user interacts with a display of the asset in repaired form.

FIG. 2B illustrates further details for enabling high-quality user interactive display in 3D manipulation interface 110*c*. For example, in FIG. 2B the 3D manipulation interface 110*c* includes additional interactive display interfaces 200*c* and 200*d*, in which the end user is able to interact with a repaired form of the asset 180. That is, FIG. 2B shows that asset 180 has a repaired portion 185*b*. As before, the 3D manipulation interface 110*c* can comprise an interactive display constructed from the actual image taken via element 113, or can comprise a 3D generic model of asset 180 obtained from the asset manufacturer, or reconstructed via other means. The display interface 200*c* may show the asset 180 as photographed for each portion except for the repaired portion, which may be simulated to show an original or repaired form 185*b*, and pieced together by color server 120*a*.

FIG. 2B shows that the user can then modify or select various other options to view as best as possible how the asset 180 may look upon final application. To enable this, the 3D manipulation interface 110*c* comprises the previously described matched colors interface 207, as well as a rotation element 240, which enables the user to rotate the view and angle of the asset 180, as shown in comparison between the updates to the interactive display 200*c*-200*d*. In addition, FIG. 2B shows that the 3D manipulation interface 110*c* can comprise one or more selectable elements in the form of a light source modifier 230. The light source modifier can include a slider 235, for changing the position of the selected form of light (e.g., the sunlight icon shown in interactive display 200*d*). One will appreciate that the light source modifier 230 can further include options from changing the type of light source (e.g., indoor versus outdoor lighting), brightness, time of day, as well as the numbers of light sources used at a time.

Each selection and/or modification made by the user is sent to the color server 120*a* via one or more user input messages 245, and the color server 120*a* responds with one or more corresponding rendering data update messages 250. The end user, asset repair personnel, third-party payor, or the like, can thus observe the asset 180 in a wide variety of true to life environments, and see, for example, the color of a tricoat application in one source of light versus another source of light, as well as a different color with different sub-component characteristics (e.g., different effect pigments) in various sources of light. This ability to manipulate the asset 180 with a wide variety of factors and receive instant, true-to-life interactive display adds significant speed, efficiency, and waste minimization to the estimation process.

Figure 3:
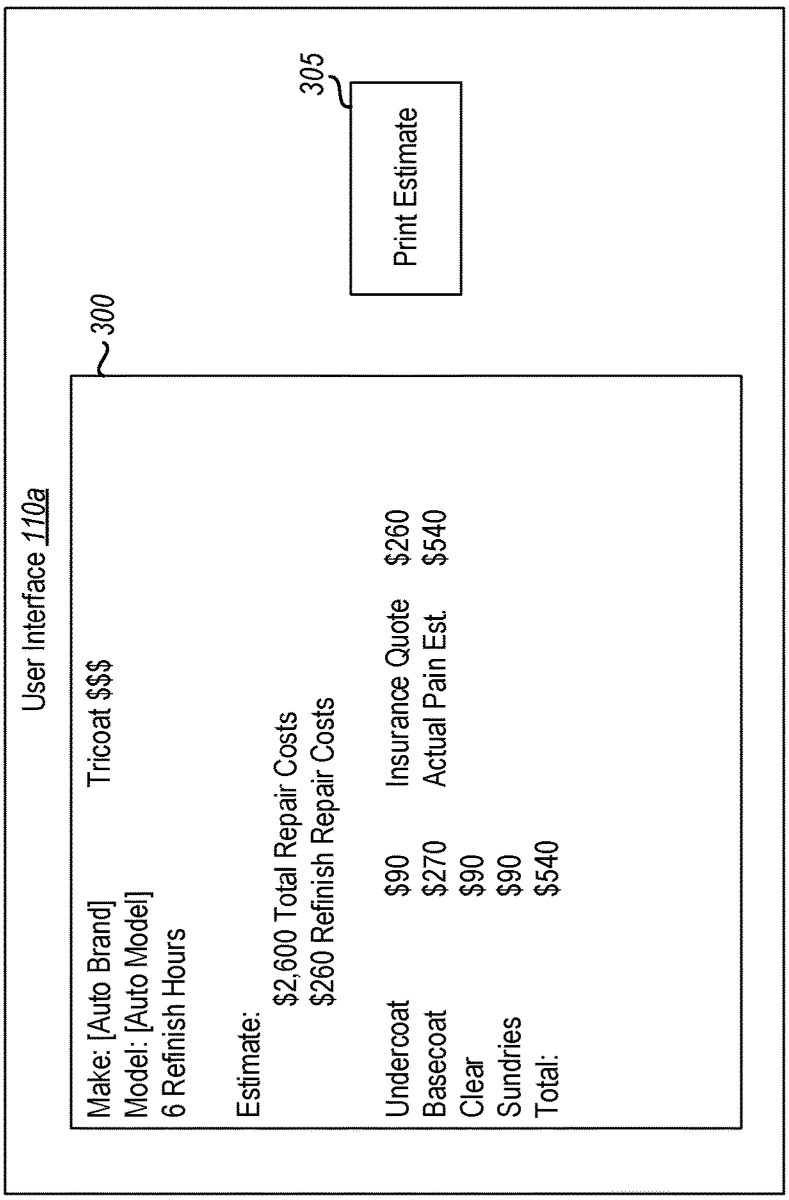
FIG. 3 illustrates a user interface that shows the calculations made upon completion of user modifications, and selection of an appropriate color.

FIG. 3 illustrates that user interface 110*a* can further show the calculations made upon completion of interactive display, and selection of an appropriate color. For example, after user selection of the final color, with full consideration of cost considerations, and other visual effects, user interface 110*a* allows the end user to view an entire quote with full breakdown. For example, user interface 110*a* pulls data retrieved from the asset repair personnel from user estimate interface 205, and displays an element-by-element breakdown of the anticipated costs, including quotes for third-party payors. FIG. 3 further shows that the user interface 110*a* can display a print estimate element 305, enabling the end user or asset owner to maintain a formal copy of the finalized estimate.

Figure 4:
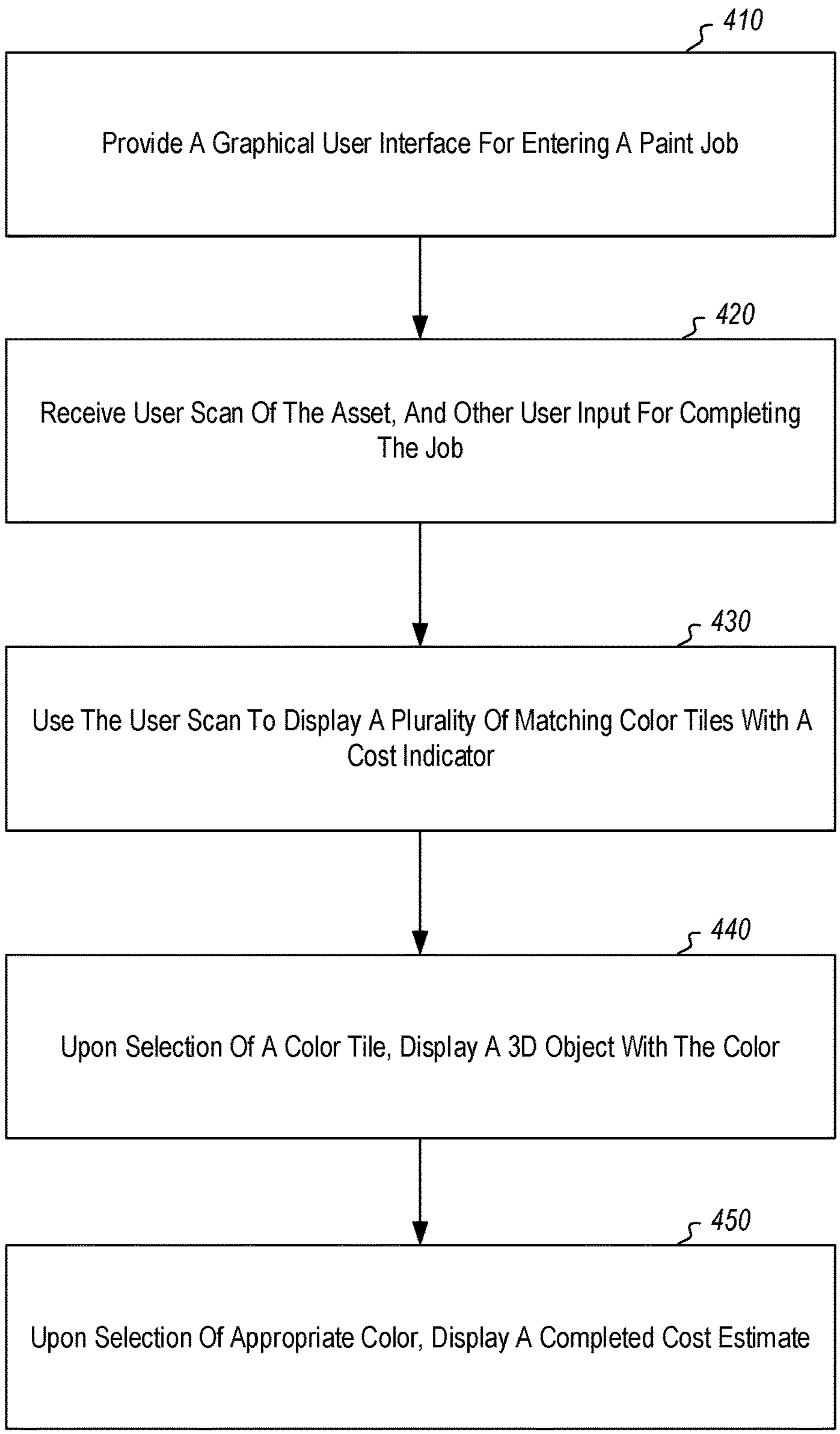
FIG. 4 illustrates a flowchart of a method according to the present invention comprising a series of acts for providing an accurate just in time estimate of an asset to be repainted.
Figure 5:
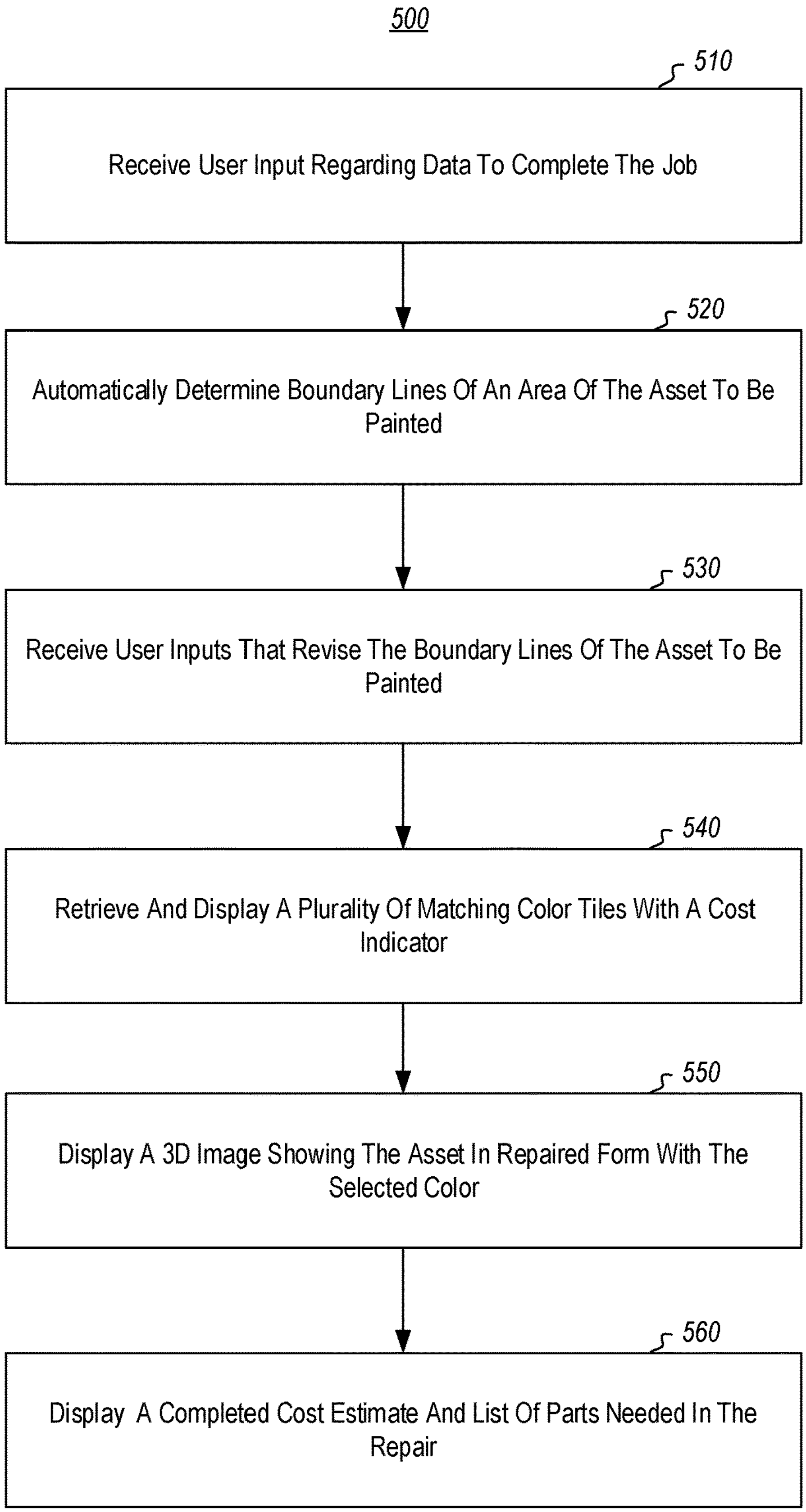
FIG. 5 illustrates a flowchart of an additional or alternative method according to the present invention for providing an accurate just in time estimate of an asset to be repainted.

Accordingly, FIGS. 1A through 3 provide multiple components, modules and schematics as part of a system for efficiently providing accurate refinish estimates that are reflective of true to life appearance and costs, thus significantly eliminating costly environmental waste and lost time needed to correct and refinish otherwise inaccurate selections and estimates. The present invention can also be described in terms of one or more methods for accomplishing a particular result. Along these lines, FIG. 4 and FIG. 5 illustrate various methods for providing an accurate, just-in-time estimate of an asset to be repainted. The acts and steps of FIGS. 4 and 5 are discussed below with reference to the systems components and modules of FIGS. 1A-3, which can be used to perform these acts and steps.

For example, FIG. 4 shows that a method 400 of providing an accurate just in time estimate of an asset to be repainted can comprise an act 410 of providing a graphical user interface for entering a paint job. Act 410 includes providing a graphical user interface comprising one or more selectable elements for entering information about a paint job, the paint job corresponding to repair of an asset that has been damaged. For example, an end user such as an asset repair operator opens user interface 110 on computer system 105 to begin creating a job for repair of asset 180. The paint job includes at least the coating requirements in connection with the asset repair.

FIG. 4 also shows that method 400 can comprise an act 420 of receiving user scans of the asset, and other user input for completing the job. Act 420 includes receiving user input via the one or more initial input fields, wherein the received user input includes: (i) a digital scan of the asset by a hand-held instrument; (ii) a digital image taken of a portion of the asset to be repainted; and (iii) a user time estimate that corresponds to an amount of time needed to repaint the asset. For example, FIG. 1C shows that user 190 uses computer system 105 to capture an image of asset 180, and further to scan asset 180 using scanner 107, thereby gathering additional non-image related data. FIG. 2A shows that the user 190 can also provide separate input through various fields in user estimates interface 205. Thus, the inputs provided are in some parts mechanically or machine-determined (e.g., via elements 113, and scanner 107), and in part human determined (via interface 205).

In addition, FIG. 4 shows that the method 400 can comprise an act 430 of using the user scan to display a plurality of matching color tiles with a cost indicator. Act 430 includes retrieving from a database a plurality of closest match colors corresponding to the color data obtained by the scanning operation (e.g., spectrophotometer data), and displaying on the graphical user interface a plurality of selectable color tiles corresponding to the spectrophotometer data, wherein at least one of the selectable color tiles includes a cost indicator. For example, FIG. 2A shows that color match interface 110*c* displays an interface 207 listing colors 150*a*, 150*b*, and 150*c* as corresponding color tiles 220*a*, 220*b*, and 220*c*, along with various secondary indicators related to cost in the form of dollar signs ("S," "SSS," "Tricoat," etc.)

Furthermore, FIG. 4 shows that method 400 can comprise an act 440 of, upon selection of a color tile, displaying a 3D object with the color. Act 440 includes, upon selection of any of the selectable color tiles, displaying on the graphical user interface a 3D image a color corresponding to the selected tile, wherein the 3D image shows different color effects at different angles of the displayed color from one or more light sources. For example, FIG. 2B shows 3D manipulation interface 110*c* with a variety of controls to both display the asset 180 along with selections to repaint the asset with a matched color via selectable color tiles 220*a*, 220*b*, 220*c*, to adjust the light source(s) via one or more elements 230, and slider 235, and to toggle the position of the asset 180 to show various color effects against different lighting via the interactive display 200(*c*-*d*).

Still further, FIG. 4 shows that the method 400 can comprise an act 450 of, upon selection of an appropriate color, displaying a completed cost estimate. Act 450 includes, upon receiving a final color selection of the selectable color tiles, displaying on the graphical user interface a final estimate to refinish the asset, wherein the final estimate includes a cost of repainting the asset based on a volume and cost of paint determined from the received final color selection and received user input via the one or more initial input fields. For example, FIG. 3 shows that, upon selection of a final color, user interface 110*a* can display an estimate interface 300, with one or more selectable print (or finalize) options 305.

In addition to the foregoing, FIG. 5 illustrates that an additional or alternative method 500 for providing an accurate just in time estimate of an asset to be repainted can comprise an act 510 of receiving user input regarding data to complete a job. Act 510 includes receiving user input via one or more initial input fields displayed on a graphical user interface, wherein the received user input includes: (i) a digital scan of a color by a hand-held instrument; (ii) a digital image taken of a portion of the asset to be repainted; and (iii) a user time estimate that corresponds to an amount of time needed to repaint the asset. For example, as previously described with respect to FIGS. 1A-1C, a user 190 can use one or more devices to digitally capture image information and other scanned information (e.g., spectrophotometric information, colorimetric information, barcode or QR code information, VIN information, etc.) Similarly, FIG. 2A shows that an estimation interface provides several user estimate fields 210(*a*-*d*) for providing human input or human adjustments relevant to refinishing a particular asset.

FIG. 5 also shows that method 500 can comprise an act 520 of automatically determining boundary lines of an area of the asset to be painted. Act 520 includes using one or more machine learning algorithms to automatically determine an area of the asset to be repainted, and displaying the digital image with one or more lines drawn around the determined area of the asset. For example, FIG. 1C shows that color server 120 can receive image and scan information via messages 117 and 109, and process this information via image processing module 125*c* and/or 3D processing 125*d*, in further connection with one or more machine learning algorithms 170 deploying for example object and/or sematic segmentation. FIG. 2A shows that the detected asset 180 can be displayed in an interactive display interface 200*a*, and which further displays or highlights a detected portion 185*a* to be repaired. The auto detection of the asset 180 and areas to be repaired 185*a* can be performed via machine learning algorithms 170.

In addition, FIG. 5 shows that method 500 can comprise an act 530 of receiving user inputs that revise the boundary lines of the asset to be painted. Act 530 includes receiving one or more user inputs that adjusts the lines drawn on the determined area, thereby providing an adjusted area of the asset to be repainted. For example, an end user can adjust the boundary lines 185*a* in the interactive display 200*a*. The user's input can be fed back to the machine learning algorithms 170 for additional training.

Furthermore, FIG. 5 shows that method 500 can comprise an act 540 of retrieving and displaying a plurality of matching color tiles with a cost indicator. Act 540 includes retrieving from a database a plurality of closest match colors corresponding to results of the digital scan, and displaying on the graphical user interface a plurality of selectable color tiles corresponding to results of the digital scan, wherein at least one of the selectable color tiles comprises a premium color tile displaying a premium color and a corresponding text indicator of cost status. For example, FIG. 2A shows a color match interface 110*c* and a matched colors interface 207, which display matched colors 150*a*, 150*b*, and 150*c* in the form of selectable color tiles 220*a*-220*c*. Color tiles 220*a*-220*c*, in turn, further display additional indicators such as cost indicators (indicating a premium color), and popularity indicators.

Still further, FIG. 5 shows that method 500 can comprise an act 550 of displaying a 3D image showing the asset in repaired form with the selected color. Act 550 includes upon selection of the premium color tile, displaying on the graphical user interface a 3D image of the asset showing a repaired form of the adjusted area that has been painted with the premium color, wherein the 3D image shows different color effects at different angles of the displayed premium color from a single light source. For example, FIG. 2B shows that, with 3D manipulation interface 110*c*, asset 180 can be displayed with options for repainting with different colors in a matched color area, and that the asset 180 and various selectable light sources can be repositioned about each other to interactively experience/observe a maximum number of light conditions and color effects at different angles.

Finally, FIG. 5 shows that method 500 can comprise an act 560 of displaying a completed cost estimate and list of parts needed in the repair thereof. Act 560 includes, upon receiving a final color selection of the premium color, displaying on the graphical user interface a final estimate to refinish the asset, wherein the final estimate includes a list of parts needed to repair the asset, and a cost of repainting the asset based on a volume of paint determined from the digital image and the user time entry. For example, as previously described, after selection of an appropriate color, the user can open an estimate interface 300, and print/finalize the estimate via one or more selectable elements 305.

One will appreciate, therefore, in view of the present specification and claims that the present invention can be practiced in a wide range of settings to provide accurate, just-in-time, contextually related information for properly, quickly, and accurately estimating repair of an asset with minimal waste. One will further appreciate that the present invention can be implemented in a wide range of settings. For example, in addition to the automotive-style asset repair analyses described herein, the present invention can be applied to defect analysis and repair employed in a wide range of assets, including heavy industrial and light industrial equipment.

The present invention can also be practiced with respect to more traditional facilities in the form of roofed buildings, such as to identify degradation/corrosion in or on buildings, and/or with coil steel, metal roofs, and other structural components. The present invention (in particular principles of artificial intelligence) can further be used to identify a particular color, or even quality of a color match, such as may be used in automotive and residential coating matches. Still further, the present invention can be used in connection with style transfer, namely transferring a photo-realistic image of a style of one picture into another one. One will appreciate therefore that principles of the present invention can be applied not just to maintenance, but also to general principles of quality assessment and assurance in a wide range of both industrial and personal use settings.

The present invention may comprise or utilize a special-purpose or general-purpose computer system that includes computer hardware, such as, for example, one or more processors and system memory, as discussed in greater detail below. The scope of the present invention also includes physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

A cloud-computing environment, or cloud-computing platform, may comprise a system that includes one or more hosts that are each capable of running one or more virtual machines. During operation, virtual machines emulate an operational computing system, supporting an operating system and perhaps one or more other applications as well. Each host may include a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

In view of the foregoing, the present invention may be embodied in multiple different configurations, as outlined above, and as exemplified by the descriptions of various exemplary aspects.

For example, in a first aspect, in one configuration, a computer-implemented method for providing an accurate, just-in-time estimate of an asset to be repainted, can include providing a graphical user interface comprising one or more selectable elements for entering information about a paint job, the paint job corresponding to repair of an asset that has been damaged; receiving user input via the one or more initial input fields, wherein the received user input includes: (i) a digital scan of the asset by a hand-held instrument; (ii) a digital image taken of a portion of the asset to be repainted; and (iii) a user time estimate that corresponds to an amount of time needed to repaint the asset; retrieving from a database a plurality of closest match colors corresponding to the spectrophotometer data; displaying on the graphical user interface a plurality of selectable color tiles corresponding to the spectrophotometer data, wherein at least one of the selectable color tiles includes a cost indicator; upon selection of any of the selectable color tiles, displaying on the graphical user interface a 3D image a color corresponding to the selected tile, wherein the 3D image shows different color effects at different angles of the displayed color from one or more light sources; and upon receiving a final color selection of the selectable color tiles, displaying on the graphical user interface a final estimate to refinish the asset, wherein the final estimate includes a cost of repainting the asset based on a volume and cost of paint determined from the received final color selection and received user input via the one or more initial input fields.

In a second aspect, the displayed cost indicator in the computer-implemented method according to the first aspect identifies the corresponding color tile as a tricoat color. In a third aspect, the final estimate in the computer-implemented method according to any one of the preceding first or second aspects further includes a list of parts needed to repair the asset, the list of parts being retrieved from the database. In a fourth aspect, the digital scan in the computer-implemented method according to any one of the preceding first to third aspects can include a scan of the asset using a spectrophotometer, the received user input including spectrophotometer data. In a fifth aspect, the computer-implemented method according to any one of the preceding first to fourth aspects can include using a machine learning algorithm to identify one or more damaged areas of the asset to be repainted. According to a sixth aspect, the computer-implemented method according to any one of the preceding first to fifth aspects can additionally include displaying, by the computer system, one or more drop-down menu items corresponding to the asset; wherein the one or more drop-down menu items provide input regarding damage of the asset.

In a seventh aspect, the computer-implemented method as described above for the first to sixth aspects can also include receiving a new user selection of an alternate basecoat option for the corresponding color displayed of the 3D image; and displaying an adjusted 3D image of the corresponding color that reflects the selected alternate basecoat option. In an eighth aspect, the computer-implemented method as described above for any of the first to seventh aspects can include creating a job card entry in the database of the computer system upon receipt of the user time estimate that the user assigns to completion of the paint job. In a ninth aspect, at least two of the selectable color tiles in the computer-implemented method as described above for the first through eighth aspects include a matching color retrieved from the database, wherein one of the at least two selectable color tiles is identified as a tricoat color that requires multiple layers of coatings, and the other of selectable color tile is a standard color that only requires a single layer of coating, the method further including displaying the 3D image with either the tricoat color or the standard color upon user selection thereof. In a tenth aspect, the damage to the asset in the computer-implemented method according to any one of the preceding first to ninth aspects can include fading or discoloration of an original coating of the asset.

Furthermore, in an eleventh aspect, in another configuration, a computer-implemented method for providing an accurate, just-in-time estimate of an asset to be repainted can include receiving user input via one or more initial input fields displayed on a graphical user interface, wherein the received user input includes: (i) a digital scan of a color by a hand-held instrument; (ii) a digital image taken of a portion of the asset to be repainted; and (iii) a user time estimate that corresponds to an amount of time needed to repaint the asset; using one or more machine learning algorithms to automatically determine an area of the asset to be repainted, and displaying the digital image with one or more lines drawn around the determined area of the asset; receiving one or more user inputs that adjusts the lines drawn on the determined area, thereby providing an adjusted area of the asset to be repainted; retrieving from a database a plurality of closest match colors corresponding to results of the digital scan; displaying on the graphical user interface a plurality of selectable color tiles corresponding to results of the digital scan; upon selection of the premium color tile, displaying on the graphical user interface a 3D image of the asset showing a repaired form of the adjusted area that has been painted with the premium color, wherein the 3D image shows different color effects at different angles of the displayed premium color from a single light source; and upon receiving a final color selection of the premium color, displaying on the graphical user interface a final estimate to refinish the asset, wherein the final estimate includes a list of parts needed to repair the asset, and a cost of repainting the asset based on a volume of paint determined from the digital image and the user time entry for completion of the paint job.

In a twelfth aspect, in the computer-implemented method according to the preceding eleventh aspect, the hand-held instrument can include a spectrophotometer; and the digital scan of the color can include a scan by the spectrophotometer of the asset. In a thirteenth aspect, in the computer-implemented method according to any one of the preceding eleventh or twelfth aspects, the hand-held instrument can include a portable digital device; and the digital scan of the color can include a scan by the portable digital device of a barcode or QR code. In a fourteenth aspect, the displayed cost indicator in the computer-implemented method according to any one of the preceding eleventh to thirteenth aspects identifies the corresponding color tile as a tricoat color. In a fifteenth aspect, the final estimate in the computer-implemented method according to any one of the preceding eleventh to fourteenth aspects further includes a list of parts needed to repair the asset.

In a sixteenth aspect, the computer-implemented method according to any one of the preceding eleventh to fifteenth aspects can further include displaying one or more drop-down menu items corresponding to the asset; wherein the one or more drop-down menu items provide input regarding damage of the asset. In a seventeenth aspect, the computer-implemented method according to any one of the preceding eleventh to sixteenth aspects can further include receiving a new user selection of an alternate basecoat option for the corresponding color displayed of the 3D image; and displaying an updated 3D image of the corresponding color that reflects the selected alternate basecoat option. In an eighteenth aspect, the computer-implemented method according to any one of the preceeding eleventh through seventeenth aspects can include creating a job card entry in the database upon receipt of the user time estimate. In a nineteenth aspect, in the computer-implemented method according to any one of the preceding eleventh to eighteenth aspects, at least two of the selectable color tiles can include the same color, wherein one of the at least two selectable color tiles is identified as a tricoat color, and the other of the selectable color tile is a standard color; and the method can further include displaying the 3D image with either the tricoat color or the standard color upon user selection thereof. Furthermore, in a twentieth aspect, in the computer-implemented method according to any one of the preceding eleventh to nineteenth aspects, at least one of the selectable color tiles can include a premium color tile that displays a premium color and a corresponding text indicator of cost status.

Furthermore, in an exemplary twenty-first aspect, in still another configuration, a computer-implemented method for providing an accurate, just-in-time estimate of an asset that has been damaged to be repainted using a computer system, can include obtaining color data associated with the asset by a hand-held scanning instrument; taking a digital image of a portion of the asset to be repainted by an image capture element; transferring the obtained color data and digital image to the computer system; receiving user input via a graphical user interface of the computer system comprising one or more selectable elements for entering information about a paint job corresponding to a repair of the asset, wherein the received user input includes a user time estimate that corresponds to an amount of time needed to repaint the asset; optionally automatically determining, by analysis of the digital image through the computer system, an area of the asset to be repainted, and displaying, by the computer system, the digital image with one or more lines drawn around the determined area of the asset, wherein the drawn lines are adjustable by a user to provide an adjusted area of the asset to be repaired; the method further comprising: retrieving, by the computer system, from a database a plurality of closest match colors corresponding to the obtained color data associated with the asset; displaying, by the computer system, on the graphical user interface a plurality of selectable color tiles corresponding to the retrieved closest match colors, wherein at least one of the selectable color tiles includes a cost indicator; upon selection of any of the selectable color tiles, displaying, by the computer system, on the graphical user interface (a) a 3D image of a color corresponding to the selected tile, wherein the 3D image shows different color effects at different angles of the displayed color from one or more light sources or (b) a 3D image of the asset showing a repaired form of the determined and optionally adjusted area of the asset to be repainted that has been painted with the color corresponding to the selected tile, wherein the 3D image shows different color effects at different angles of the displayed color from a single light source; and upon receiving respective user input, displaying, by the computer system, on the graphical user interface a final estimate to refinish the asset, wherein the final estimate includes a cost of repainting the asset based on a volume and cost of paint determined from a particular color of the selectable color tiles finally selected by the user and the received user input about the paint job.

In a twenty-second aspect, the displayed cost indicator in the computer-implemented method according to the preceding twenty-first aspect identifies the corresponding color tile as a tricoat color. In a twenty-third aspect, the final estimate in the computer-implemented method according to any one of the preceding twenty-first or twenty-second aspects further includes a list of parts needed to repair the asset. In a twenty-fourth aspect, the asset in the computer-implemented method according to any one of the preceding twenty-first to twenty-third aspects is a vehicle. In a twenty-fifth aspect, a machine learning algorithm is used by the computer system to identify one or more damaged areas of the asset to be repainted in the computer-implemented method according to any one of the preceding twenty-first to twenty-fourth aspects. In a twenty-sixth aspect, the computer-implemented method according to any one of the preceding twenty-first to twenty-fifth aspects further can include displaying, by the computer system, one or more drop-down menu items corresponding to the asset, wherein the one or more drop-down menu items provide input regarding damage of the asset. In a twenty-seventh aspect, the method according to any one of the preceding twenty-first to twenty-sixth aspects can further include receiving a new user selection of an alternate basecoat option for the corresponding color displayed of the 3D image, and displaying an adjusted 3D image of the corresponding color that reflects the selected alternate basecoat option.

Furthermore, in a twenty-eighth aspect, the method according to any one of the preceding twenty-first to twenty-seventh aspects can further include creating a job card entry in the database of the computer system upon receipt of the user time estimate. In a twenty-ninth aspect, in the computer-implemented method according to any one of the preceding twenty-first to twenty-eighth aspects the plurality of closest matching colors retrieved from the database can include a multicoat, such as tricoat color, and a monocoat color, and displaying the 3D image with either the multicoat color or the monocoat color upon user selection thereof. In a thirtieth aspect, the damage to the asset in the computer-implemented method according to any one of the preceding twenty-first to twenty-ninth aspects can include fading or discoloration of an original coating of the asset. In a thirty-first aspect, the hand-held scanning instrument can include a spectrophotometer and the step of obtaining color data associated with the asset can include scanning of the asset using the spectrophotometer in the computer-implemented method according to any one of the preceding twenty-first to thirtieth aspects. In a further aspect, the hand-held scanning instrument can include a portable digital scanning device, and the step of obtaining color data associated with the asset can include a scan by the portable digital scanning device of a barcode or QR code in the computer-implemented method according to any one of the preceding twenty-first to thirty-first aspects.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

We claim:

1. A computer-implemented method for providing an accurate, just-in-time estimate of an asset to be repainted, comprising:

providing a graphical user interface comprising one or more selectable elements for entering information about a paint job, the paint job corresponding to repair of an asset that has been damaged;

providing a hand-held instrument configured to scan and capture optical data of the asset;

receiving, at a computer system, user input via one or more initial input fields, wherein the received user input includes: (i) a digital scan of the asset by the hand-held instrument; (ii) a digital image taken of a portion of the asset to be repainted; and (iii) a user time estimate that corresponds to an amount of time needed to repaint the asset;

using one or more machine learning algorithms to identify from the digital image an area of the asset to be painted;

displaying the digital image with at least one line drawn around the area of the asset on an interactive display interface;

calculating, using the one or more machine learning algorithms and the digital image, a number of underlying parts and an amount of paint needed for the area of the asset to be painted;

retrieving, via a network, from a remote cloud color database, a plurality of closest match paint formulations corresponding to spectrophotometer data obtained from the digital scan, the remote cloud color database comprising one or more of spectral, colorimetric, physical characteristic, and user preference data for paint formulations, and wherein each paint formulation includes formulation specific data indicative of a number of coating layers;

displaying on the graphical user interface a plurality of selectable color tiles, wherein each color tile corresponds to one among the plurality of closest match paint formulations, and wherein at least one of the selectable color tiles includes a cost indicator;

upon selection of any of the selectable color tiles, displaying on the graphical user interface an interactive 3D image of a color corresponding to the selected tile, wherein the 3D image shows different color effects at different angles of a repaired form of the asset from one or more light sources; and upon receiving a final color selection of the selectable color tiles, displaying on the graphical user interface a final estimate to refinish the asset, wherein the final estimate includes a cost of repainting the asset based on the amount of paint, determined by the one or more machine learning algorithms, and cost of paint, determined from the received final color selection.

2. The computer-implemented method as recited in claim 1, wherein the displayed cost indicator identifies the corresponding color tile as a tricoat paint formulation.

3. The computer-implemented method as recited in claim 1, wherein the final estimate further includes a list of parts needed to repair the asset, the list of parts being retrieved from the remote cloud color database.

4. The computer-implemented method as recited in claim 1, wherein the digital scan comprises a scan of the asset using a spectrophotometer, the received user input including spectrophotometer data.

5. The computer-implemented method as recited in claim 1, further comprising:

using the one or more machine learning algorithm to identify one or more damaged areas of the asset to be repainted.

6. The computer-implemented method as recited in claim 1, further comprising:

displaying, by the computer system, one or more drop-down menu items corresponding to the asset;

wherein the one or more drop-down menu items provide input regarding damage of the asset.

7. The computer-implemented method as recited in claim 1, further comprising:

receiving a new user selection of an alternate basecoat option for the corresponding paint formulation displayed of the 3D image; and displaying an adjusted 3D image of the corresponding color that reflects the selected alternate basecoat option.

8. The computer-implemented method as recited in claim 1, further comprising:

creating a job card entry in a database of the computer system upon receipt of the user time estimate that the user assigns to completion of the paint job.

9. The computer-implemented method as recited in claim 1, further comprising:

wherein at least two of the selectable color tiles comprise a matching paint formulation retrieved from the remote cloud color database, wherein one of the at least two selectable color tiles is identified as a tricoat paint formulation that requires multiple layers of coatings, and another of the at least two selectable color tiles is a standard paint formulation that only requires a single layer of coating; and displaying the 3D image with either the tricoat paint formulation or the standard paint formulation upon user selection thereof.

10. The computer-implemented method as recited in claim 1, wherein the damage to the asset comprises fading or discoloration of an original coating of the asset.

11. A computer-implemented method for providing an accurate, just-in-time estimate of an asset to be repainted, comprising:

receiving, at a computer system, user input via one or more initial input fields displayed on a graphical user interface, wherein the received user input includes: (i) a digital scan of a color of the asset by a hand-held instrument; (ii) a digital image taken of a portion of the asset to be repainted; and (iii) a user time estimate that corresponds to an amount of time needed to repaint the asset;

using one or more machine learning algorithms to automatically determine from the digital image an area of the asset to be repainted, and displaying the digital image with one or more lines drawn around the determined area of the asset on an interactive display interface;

receiving one or more user inputs that revise the lines drawn on the determined area, thereby providing an adjusted area of the asset to be repainted;

calculate, using the one or more machine learning algorithms and the digital image, a number of underlying parts and an amount of paint needed for the adjusted area of the asset to be repainted;

retrieving, via a network from a remote cloud color database a plurality of closest match paint formulations corresponding to spectrophotometer data obtained from the digital scan, the remote cloud color database comprising one or more of spectral, colorimetric, physical characteristic, and user preference data for each closest match paint formulation, and wherein each paint formulation includes formulation specific data indicative of a number of coating layers;

displaying on the graphical user interface a plurality of selectable color tiles corresponding to results of the digital scan, wherein each selectable color tile corresponds to one among the plurality of closest match paint formulations, and wherein at least one of the selectable color tiles includes a cost indicator;

upon selection of any of the selectable color tiles, displaying on the graphical user interface an interactive 3D image of the asset showing a repaired form of the adjusted area that has been rendered with a color corresponding to the selected color tile, wherein user manipulation of the 3D image shows different color effects of the displayed color corresponding to the selected color tile on the repaired form of the adjusted area from different viewing angles from a single light source; and upon receiving a final color selection of the selectable color tiles, displaying on the graphical user interface a final estimate to refinish the asset, wherein the final estimate includes a list of parts needed to repair the asset, and a cost of repainting the asset based on a volume of paint determined from the digital image and the one or more machine learning algorithms, a cost of paint determined from the received final color selection, and a user time entry for completion of a paint job.

12. The computer-implemented method as recited in claim 11, wherein:

the hand-held instrument comprises a spectrophotometer; and the digital scan of the color comprises a scan by the spectrophotometer of the asset.

13. The computer-implemented method as recited in claim 11, wherein:

the hand-held instrument comprises a portable digital device; and the digital scan of the color comprises a scan by the portable digital device of a barcode or QR code.

14. The computer-implemented method as recited in claim 11, wherein the final estimate identifies the corresponding color tile as a tricoat paint formulation.

15. The computer-implemented method as recited in claim 11, wherein the final estimate further includes a list of parts needed to repair the asset.

16. The computer-implemented method as recited in claim 11, further comprising:

displaying one or more drop-down menu items corresponding to the asset;

wherein the one or more drop-down menu items provide input regarding damage of the asset.

17. The computer-implemented method as recited in claim 11, further comprising:

receiving a new user selection of an alternate basecoat option for the corresponding paint formulation displayed on the 3D image; and displaying an updated 3D image of the corresponding paint formulation that reflects the selected alternate basecoat option.

18. The computer-implemented method as recited in claim 11, further comprising:

creating a job card entry in a database of the computer system upon receipt of the user time estimate.

19. The computer-implemented method as recited in claim 11, further comprising:

wherein at least two of the selectable color tiles comprise the same color, wherein one of the at least two selectable color tiles is identified as a tricoat paint formulation, and the other of selectable color tile is a standard paint formulation; and displaying the 3D image with either the tricoat paint formulation or the standard paint formulation upon user selection thereof.

20. The computer-implemented method as recited in claim 11, wherein at least one of the selectable color tiles comprises a premium color tile that displays a premium paint formulation and a corresponding text indicator of cost status.

* * * * *